United States Patent
Valente et al.

(10) Patent No.: US 9,200,462 B2
(45) Date of Patent: Dec. 1, 2015

(54) MOBILE ARCHED TELESCOPIC DEPLOYABLE STAGE SYSTEM

(71) Applicant: META STAGES, LLC, Los Angeles, CA (US)

(72) Inventors: Edison Valente, Santa Monica, CA (US); Rouben Grigorian Aghan, Glendale, CA (US)

(*) Notice: Subject to any disclaimer, the term of this patent is extended or adjusted under 35 U.S.C. 154(b) by 27 days.

(21) Appl. No.: 13/908,994

(22) Filed: Jun. 3, 2013

(65) Prior Publication Data
US 2013/0333302 A1    Dec. 19, 2013

Related U.S. Application Data

(60) Provisional application No. 61/689,297, filed on Jun. 4, 2012.

(51) Int. Cl.
*E04H 3/26* (2006.01)
*E04H 3/12* (2006.01)

(52) U.S. Cl.
CPC .............. *E04H 3/123* (2013.01); *E04H 3/126* (2013.01)

(58) Field of Classification Search
USPC ......... 52/6, 7, 86, 639, 641, 645; 280/30, 656
See application file for complete search history.

(56) References Cited

U.S. PATENT DOCUMENTS

| | | | | |
|---|---|---|---|---|
| 3,247,628 A * | 4/1966 | Miller | | 52/6 |
| 3,849,953 A * | 11/1974 | Cohen | | 52/86 |
| 5,152,109 A * | 10/1992 | Boers | | 52/143 |
| 6,393,769 B1 * | 5/2002 | Mertik et al. | | 52/7 |
| 8,479,473 B2 * | 7/2013 | Gutierrez et al. | | 52/742.1 |
| 8,567,811 B1 * | 10/2013 | Jones | | 280/656 |
| 2012/0272585 A1 * | 11/2012 | Bilsen et al. | | 52/7 |

\* cited by examiner

*Primary Examiner* — Jeanette E Chapman
*Assistant Examiner* — Daniel Kenny

(57) ABSTRACT

A mobile arched telescopic deployable stage system. The system has a stage portion, with a main stage portion and a plurality of extension stage portions. The extension stage portions are hinged to the main stage portion and deployable from an undeployed, folded state to a deployed, flat state. Deployable legs extend under the stage portion. The system has an arched frame portion with a right side section and a left side section, each having a lower arched portion and an upper arched portion. In a shorter, undeployed state, the upper arched portion is unextended from the lower arched portion. In longer, deployed state the upper arched portion extends from the lower arched portion. Terminal ends of the upper arched portions are pivotally attached to each other, and each of the lower arched portions being pivotally attachable at lower ends thereof to the stage portion. Raising devices raise the arched frame portion from the stage portion.

18 Claims, 30 Drawing Sheets

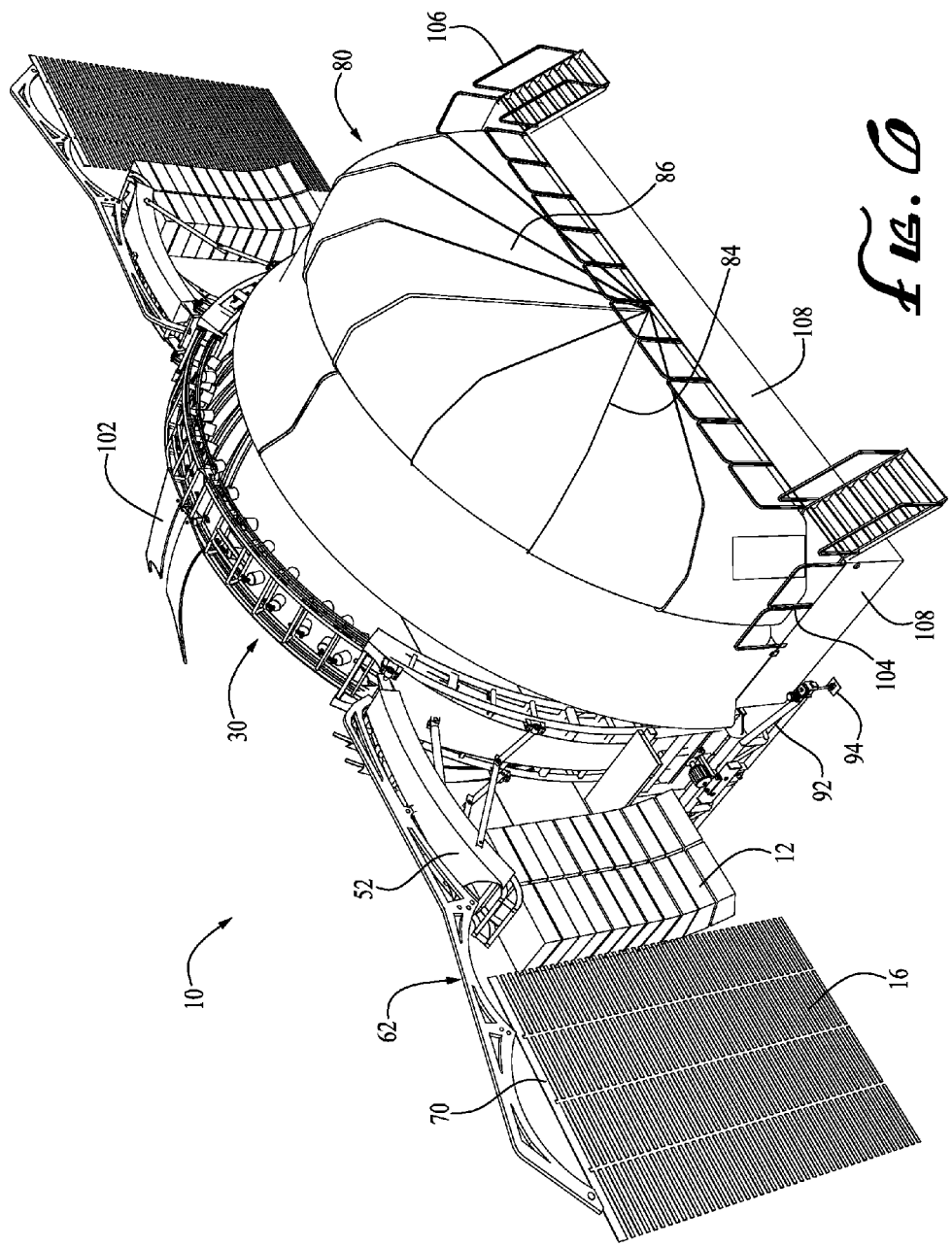

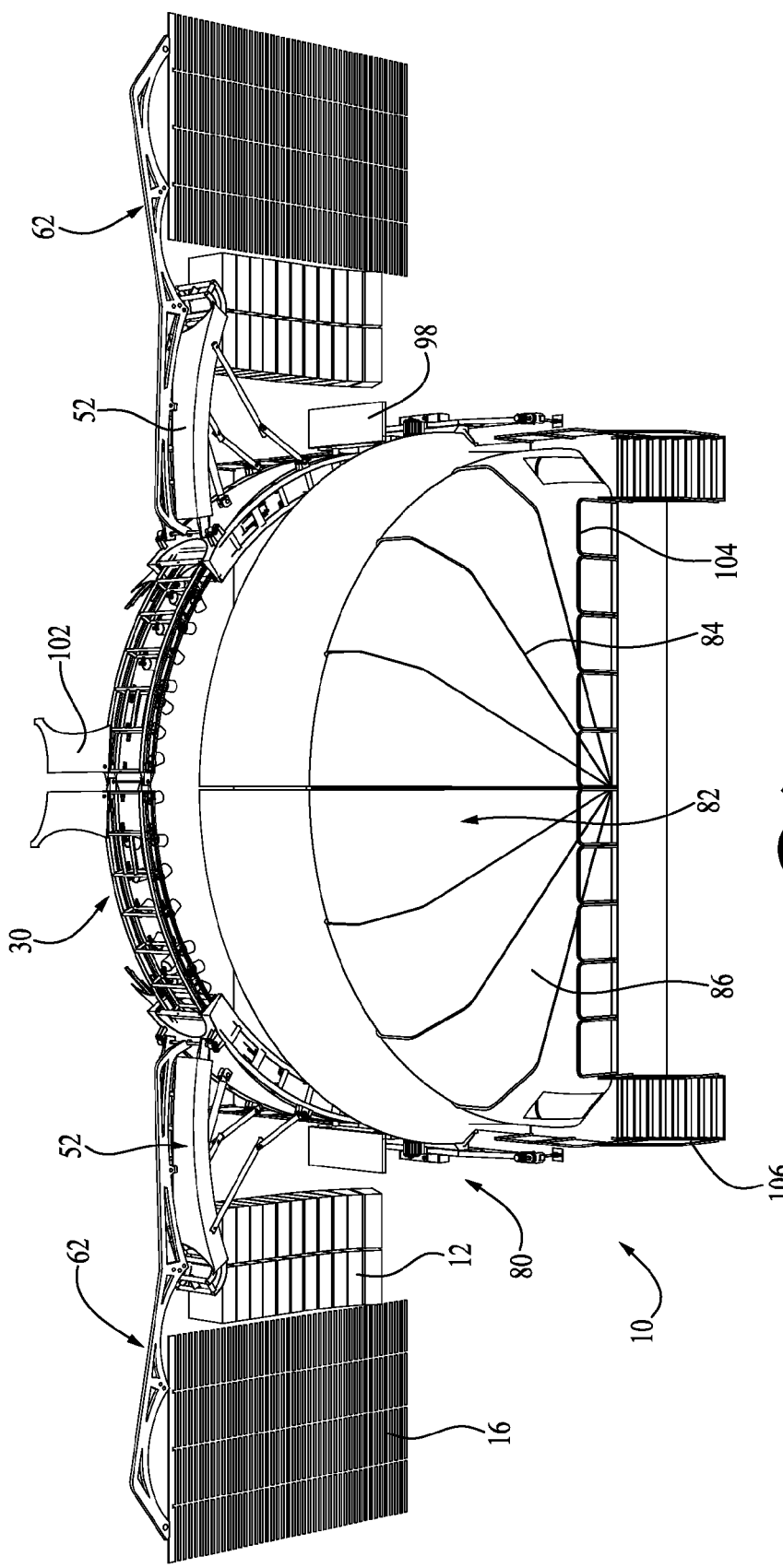

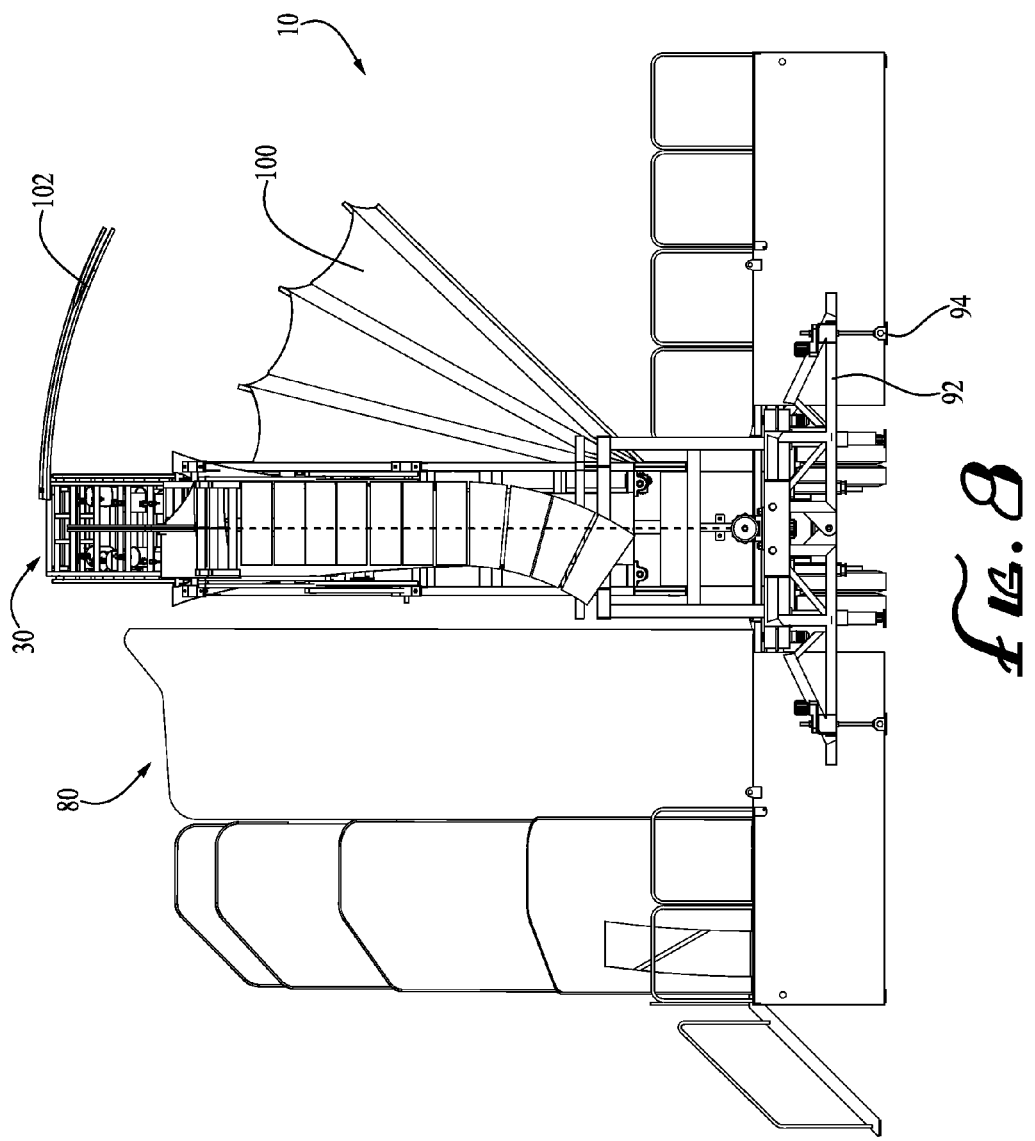

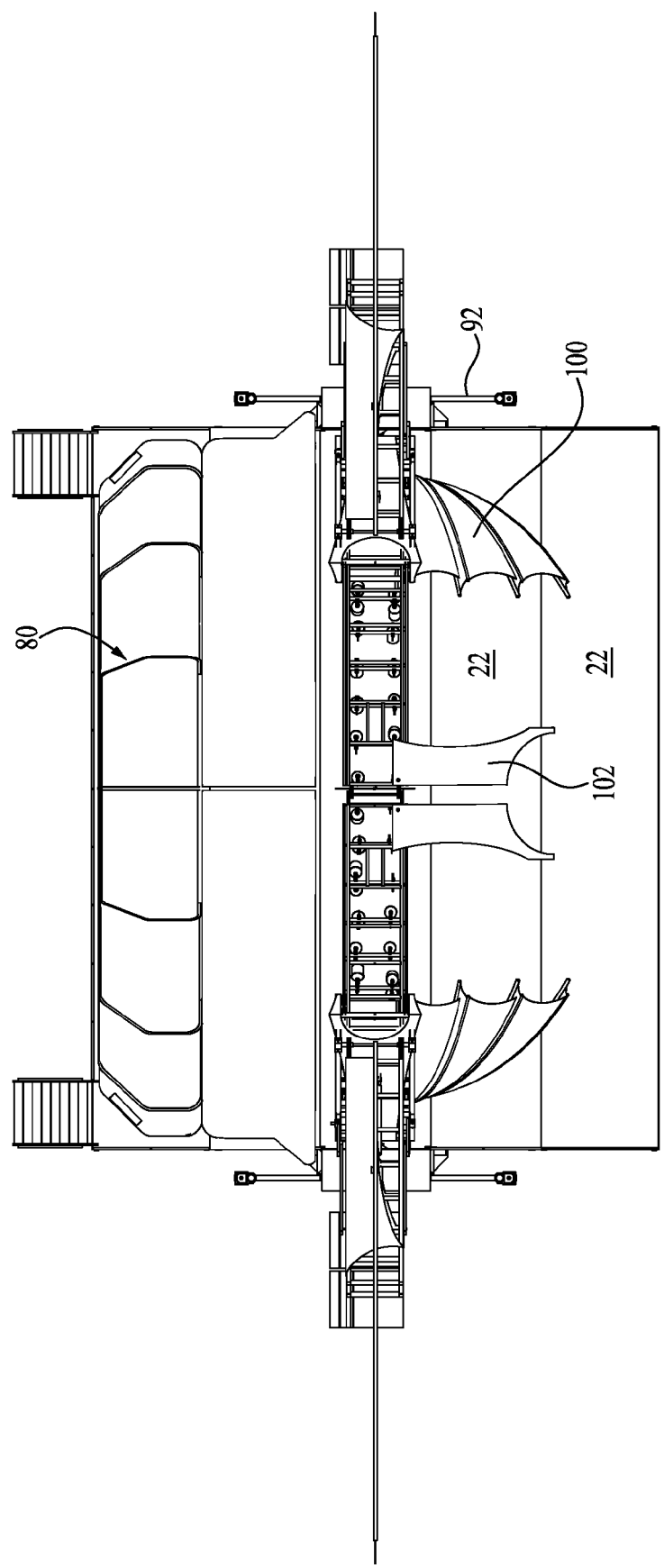

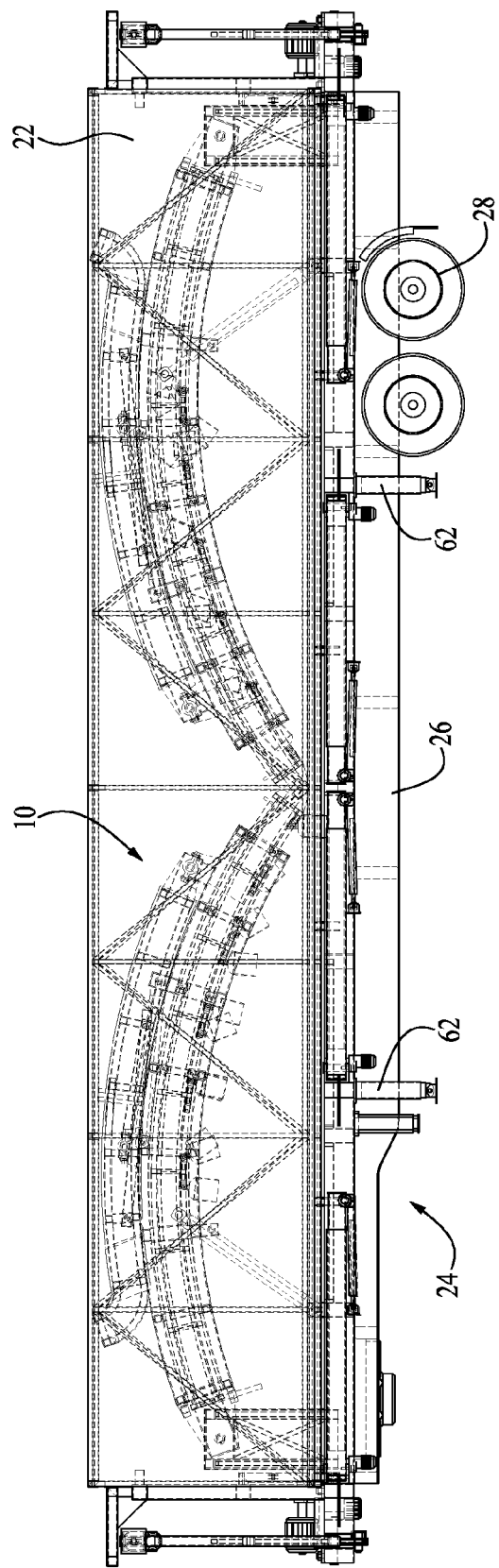

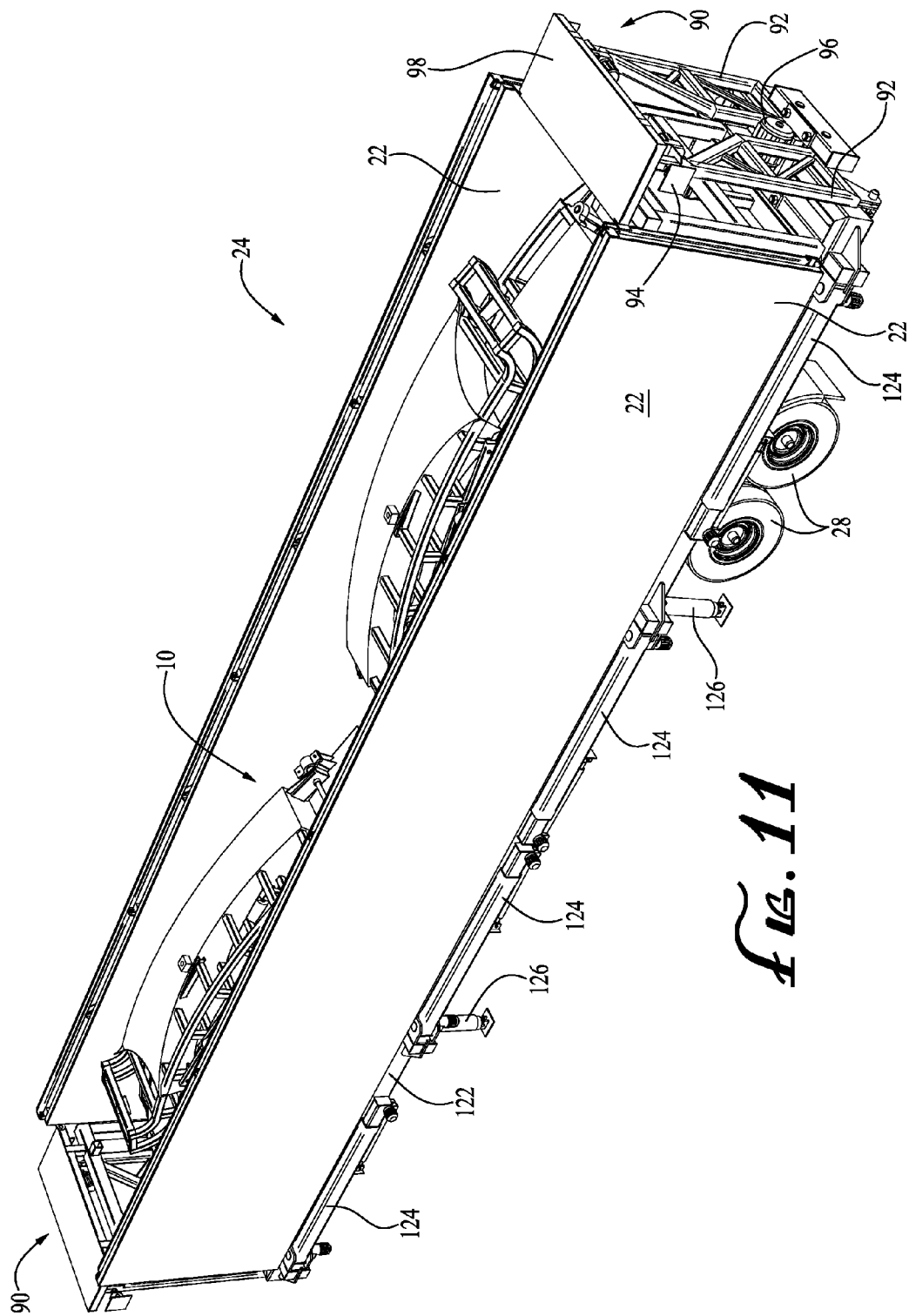

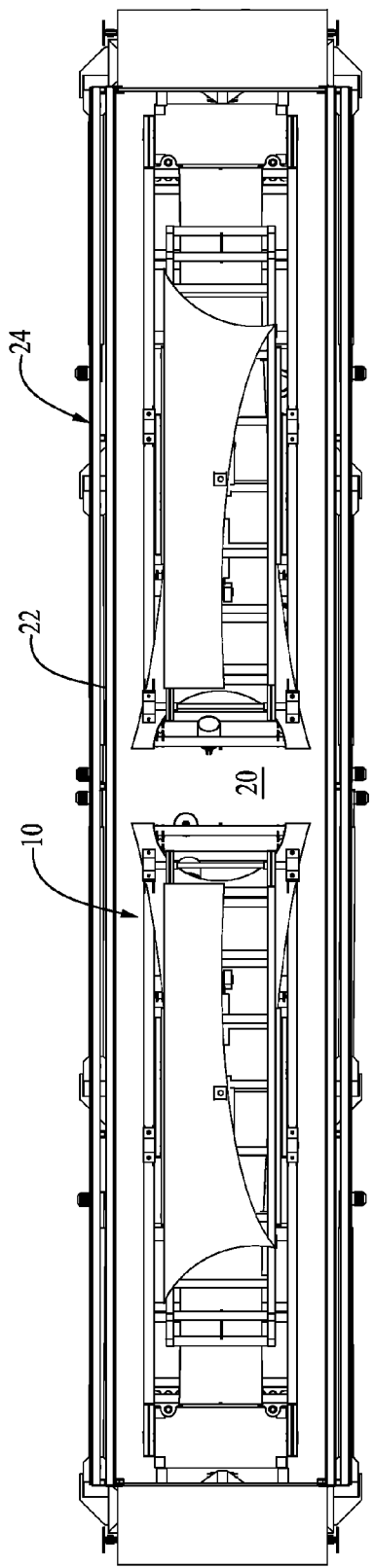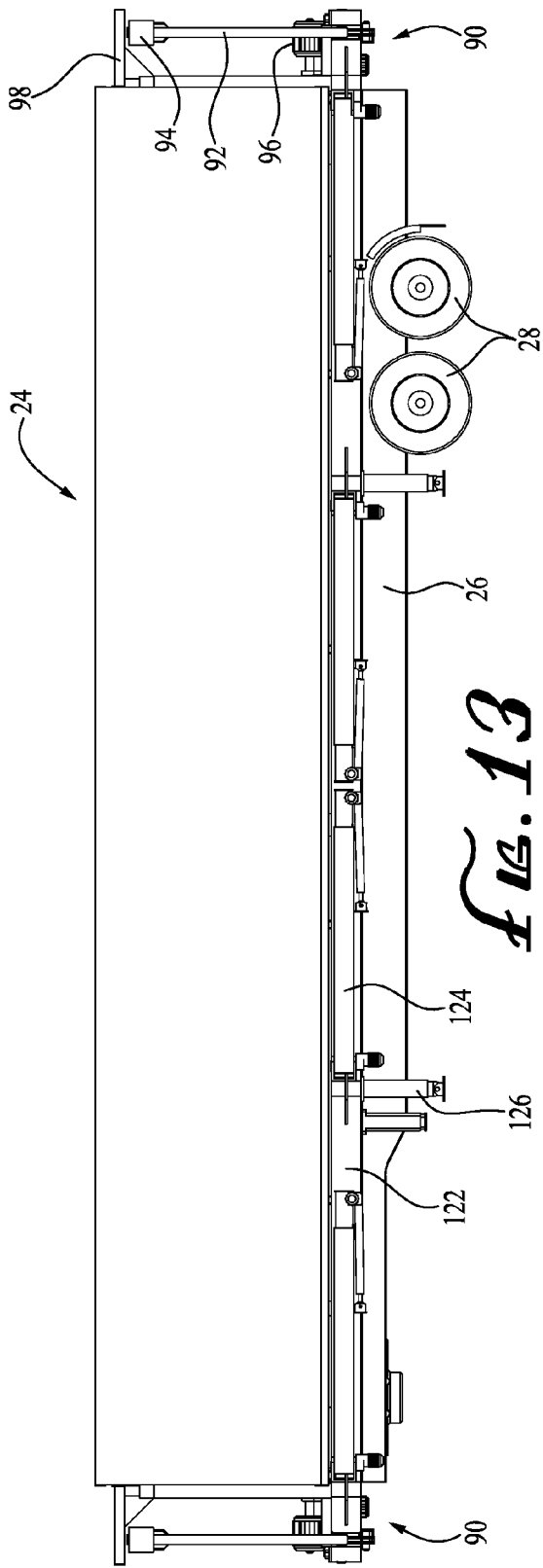

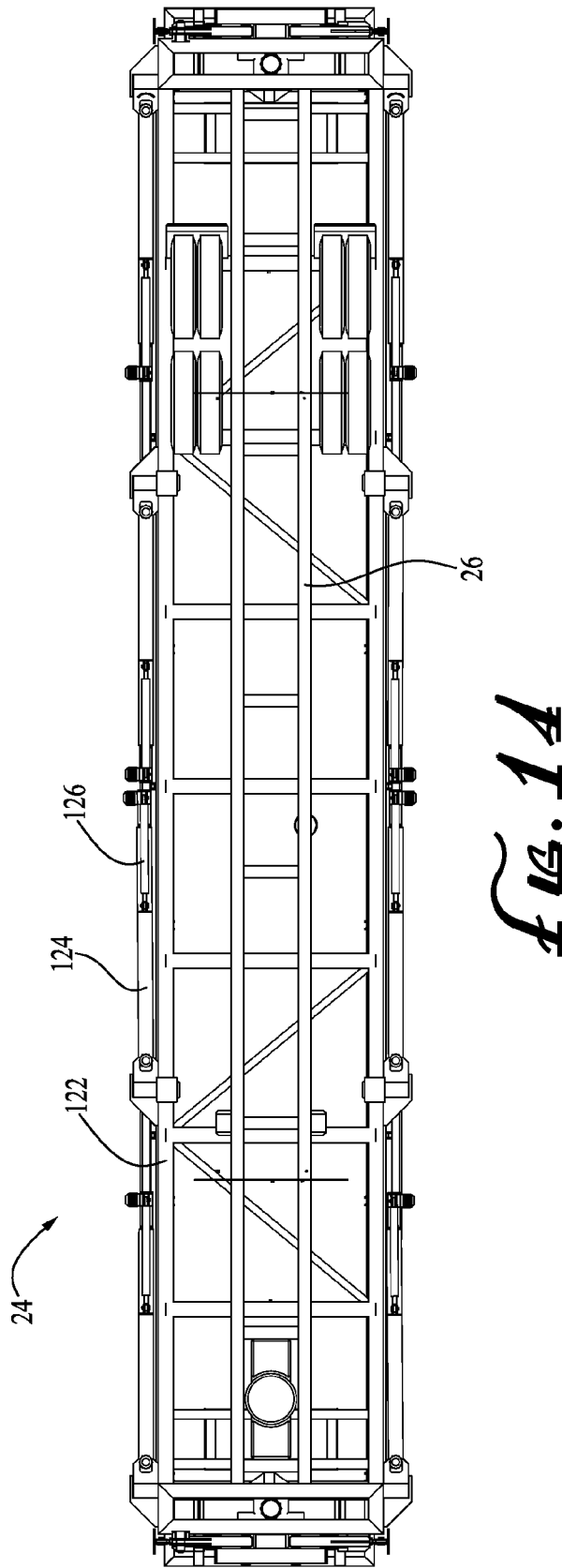

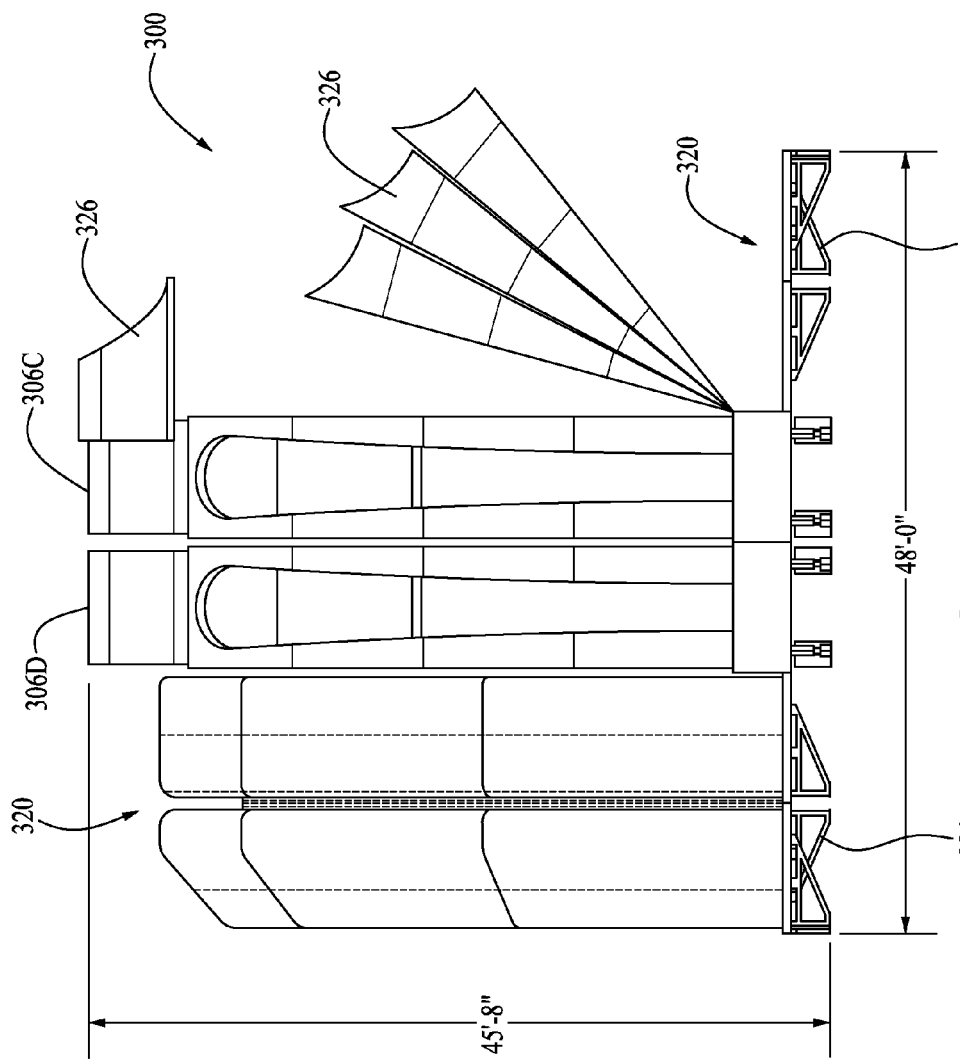

MOBILE ARCHED TELESCOPIC DEPLOYABLE STAGE SYSTEM

CROSS-REFERENCE TO RELATED APPLICATIONS

This application claims priority from U.S. Provisional Patent Application No. 61/689,297, filed Jun. 4, 2012.

FIELD OF THE INVENTION

The invention relates to the field of portable stages, and more particularly to a mobile arched telescopic deployable stage system for arts, musical, entertainment, plays, theater, expositions, film sets, exhibits, event such as inaugurations, graduation ceremonies, and other performances or events. The arched telescopic deployable stage system is moveable by truck in an undeployed state and can be quickly and automatically or semi-automatically deployed from an undeployed state, wherein the system is retained in one or more truck transportable containers, e.g., ocean style containers, to a deployed state wherein an expanded stage surface, an arched stage cover, and supports for speakers, lighting, display screens, special effects equipment, and the like will be deployed and available for immediate use. The supports can be positioned over the stage surface or outside of the stage surface.

BACKGROUND OF THE INVENTION

When musicians, dancers, actors, and other entertainers, presenters at political rallies and other events, or any other event or venues need a covered stage where one is not already present, such as in amphitheaters, assemble of a stage is required. For example, such stages can be built from scratch from various materials such as wood, metal, composites and the like, and decorated as desired. There exist a wide variety prefabricated stages such as made of metal with folding metal legs. Likewise, there are portable stages that are mounted on a chassis with permanently mounted wheels with additional deployable floor panels, and a deployable canopy, which is towable by a vehicle, such as disclosed in U.S. Pat. No. 6,393,769. However, the portable stage of U.S. Pat. No. 6,393,769 is limited in that the chassis and wheels remain permanently attached to the stage which raises the cost of the unit, includes just a flat canopy, and has not capacity for linking up more than one unit.

There accordingly remains a need for a mobile arched telescopic deployable stage system.

SUMMARY OF THE INVENTION

The invention is a mobile arched telescopic deployable stage system, comprising:

a stage portion, the stage portion having a main stage portion and at least one extension stage portion, the extension stage portion being connected to the main stage portion and deployable from an undeployed state where the extension stage portion is folded up relative to the main stage portion, to a deployed state were the main stage portion and extension stage portion are laid out flat;

deployable legs adapted to extend under the stage portion; and at least one arched frame portion, the arched frame portion having a right side section and a left side section, each of the right and left side sections having a lower arched portion and an upper arched portion, the upper arched portion being relatively unextended from the lower arched portion in a first shorter, undeployed state, to a second, longer extended state where the upper arched portion is extended from the lower arched portion, terminal ends of the upper arched portions being pivotally attached to each other, and each of the lower arched portions being pivotally attachable at lower ends thereof to the stage portion.

In another embodiment the invention provides a mobile arched telescopic deployable stage system, comprising:

a stage portion, the stage portion having a main stage portion and at least one extension stage portion, the extension stage portion being connected to the main stage portion and deployable from an undeployed state where the extension stage portion is folded up relative to the main stage portion, to a deployed state were the main stage portion and extension stage portion are laid out flat;

deployable legs adapted to extend under the stage portion;

at least one arched frame portion, the arched frame portion having a right side section and a left side section, each of the right and left side sections having a lower arched portion and an upper arched portion, the upper arched portion being relatively unextended from the lower arched portion in a first shorter, undeployed state, to a second, longer extended state where the upper arched portion is extended from the lower arched portion, terminal ends of the upper arched portions being pivotally attached to each other, and each of the lower arched portions being pivotally attachable at lower ends thereof to the stage portion;

raising devices to raise the right side section and a left side section of at least one arched frame portion; and a deployable arched backdrop, which deployable arched backdrop deploys above the stage behind the at least one arched frame portion.

The deployable stage of the invention can be made in different sizes depending on the application and end user requests, and the stage is fully collapsible to fit inside a transportation container to be transported by one single semi-trailer truck for the smaller stages, or, for larger stage applications, it can be transported by multiple semi-trailer trucks, with the portions being linked together.

BRIEF DESCRIPTION OF THE DRAWINGS

FIG. 6 is a rear top right isometric view of the mobile arched telescopic deployable stage system of FIG. 1.

FIG. 7 is a rear top isometric view of the mobile arched telescopic deployable stage system of FIG. 1.

FIG. 8 is a left side view of the mobile arched telescopic deployable stage system of FIG. 1.

FIG. 9 is a top view of the mobile arched telescopic deployable stage system of FIG. 1.

FIG. 10 is a partially revealed view showing the exemplary mobile arched telescopic deployable stage system of FIG. 1 in an undeployed state in a truck trailer.

FIG. 11 is a right top isometric view showing the exemplary mobile arched telescopic deployable stage system in an undeployed state in a truck trailer of FIG. 10.

FIG. 12 is a top isometric view showing the exemplary mobile arched telescopic deployable stage system in an undeployed state in a truck trailer of FIG. 10.

FIG. 13 is a right side view showing the exemplary mobile arched telescopic deployable stage system in an undeployed state in a truck trailer of FIG. 10.

FIG. 14 is a bottom view showing the exemplary mobile arched telescopic deployable stage system in an undeployed state in a truck trailer of FIG. 10.

FIG. 31 is a left side view of the deployable quad stage system of FIG. 28.

DETAILED DESCRIPTION

Figure 1:
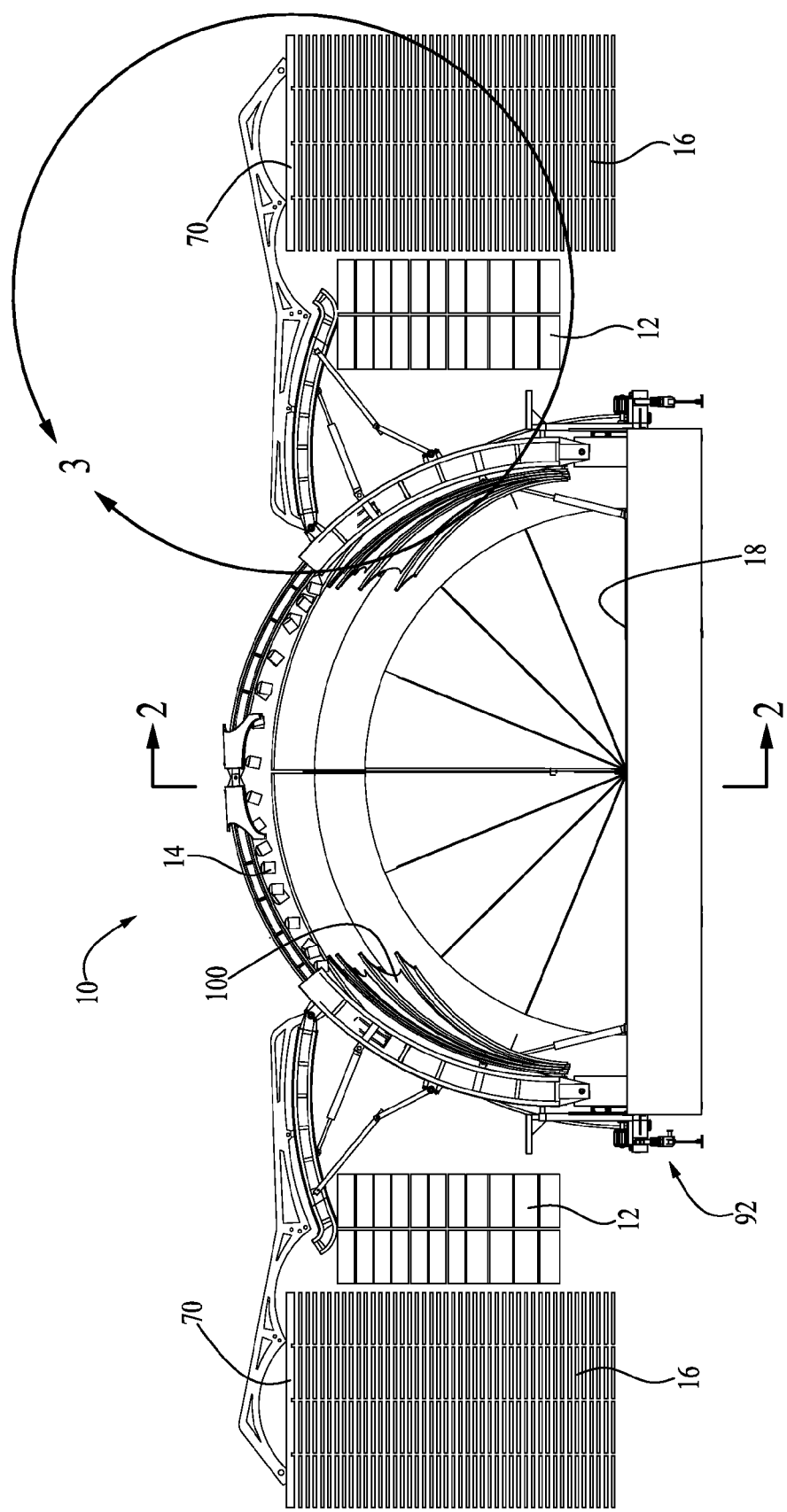
FIG. 1 is front view of an exemplary embodiment of a mobile arched telescopic deployable stage system of the invention in its fully deployed state carrying speakers, lights, and display screens.
Figure 2:
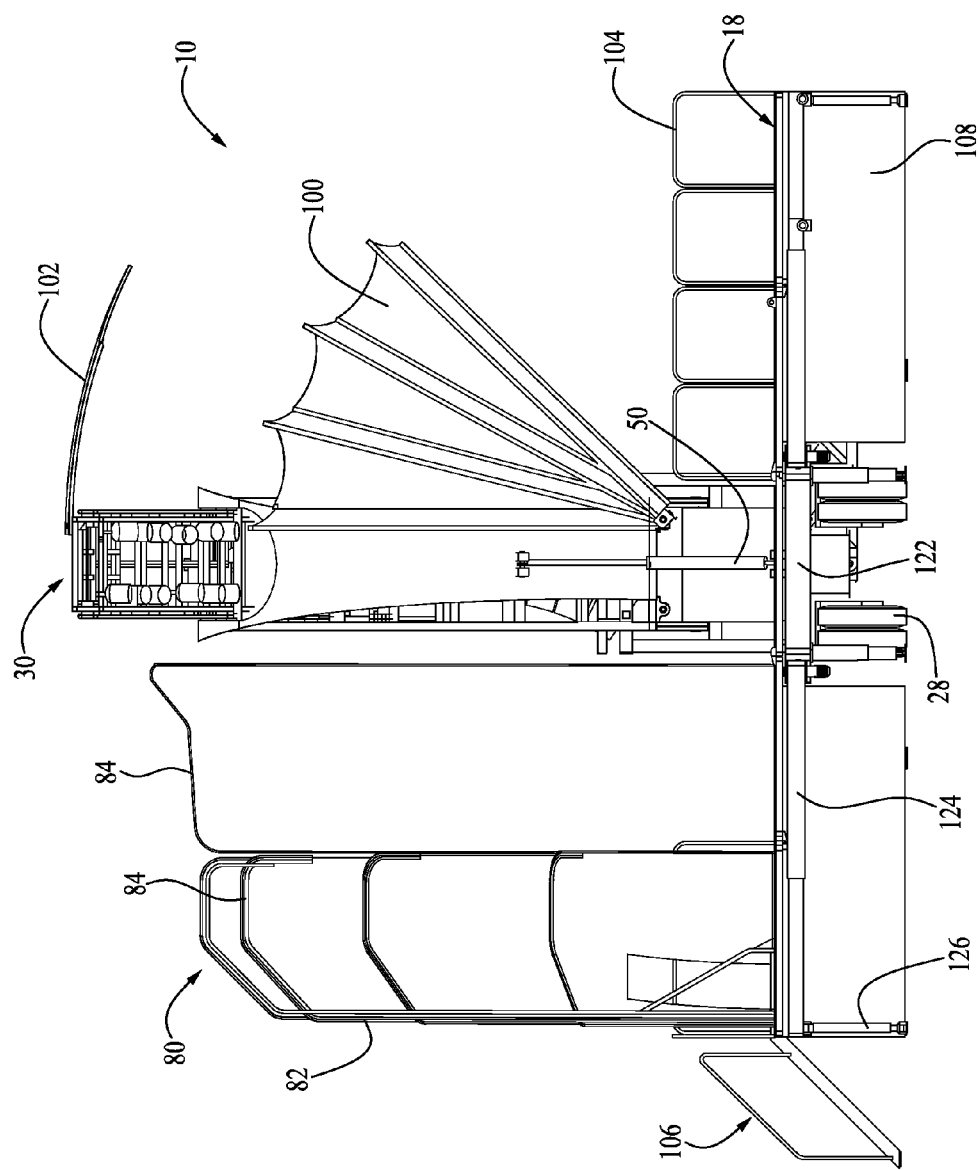
FIG. 2 is a cross-sectional view through view lines 2-2 of FIG. 1.
Figure 3:
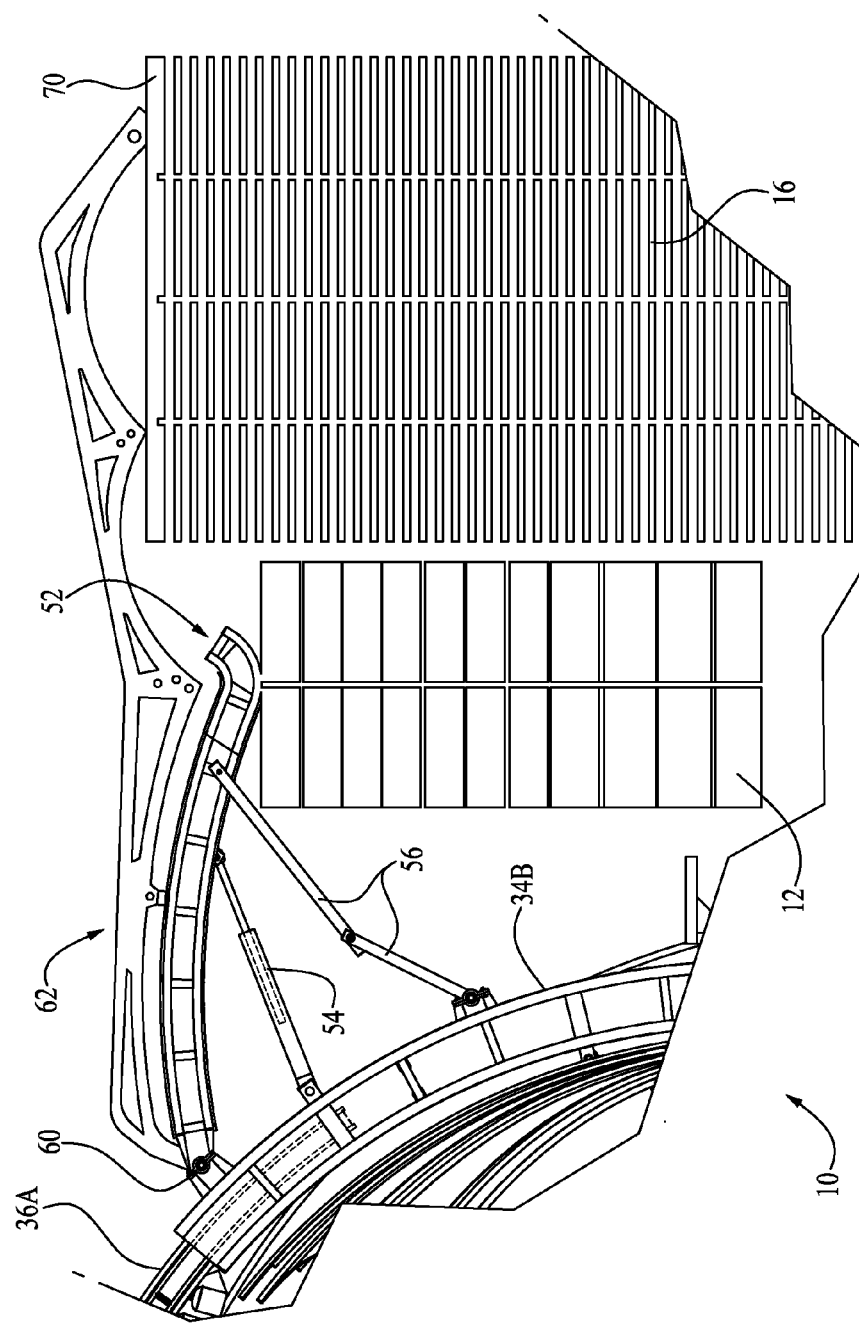
FIG. 3 is a detail view of the area shown in circled areas 3-3 of FIG. 1.
Figure 4:
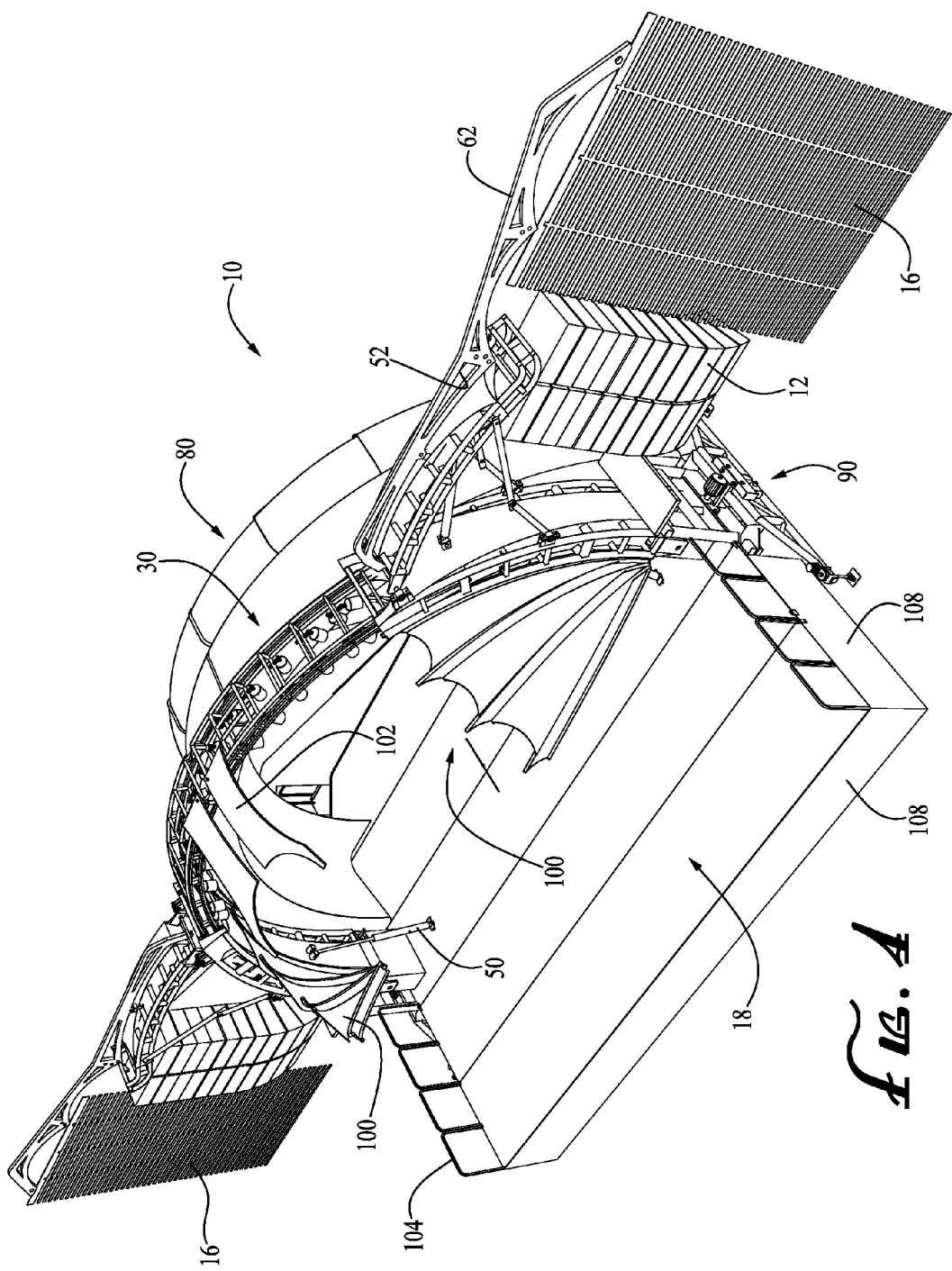
FIG. 4 is a front top right isometric view of the mobile arched telescopic deployable stage system of FIG. 1.
Figure 5:
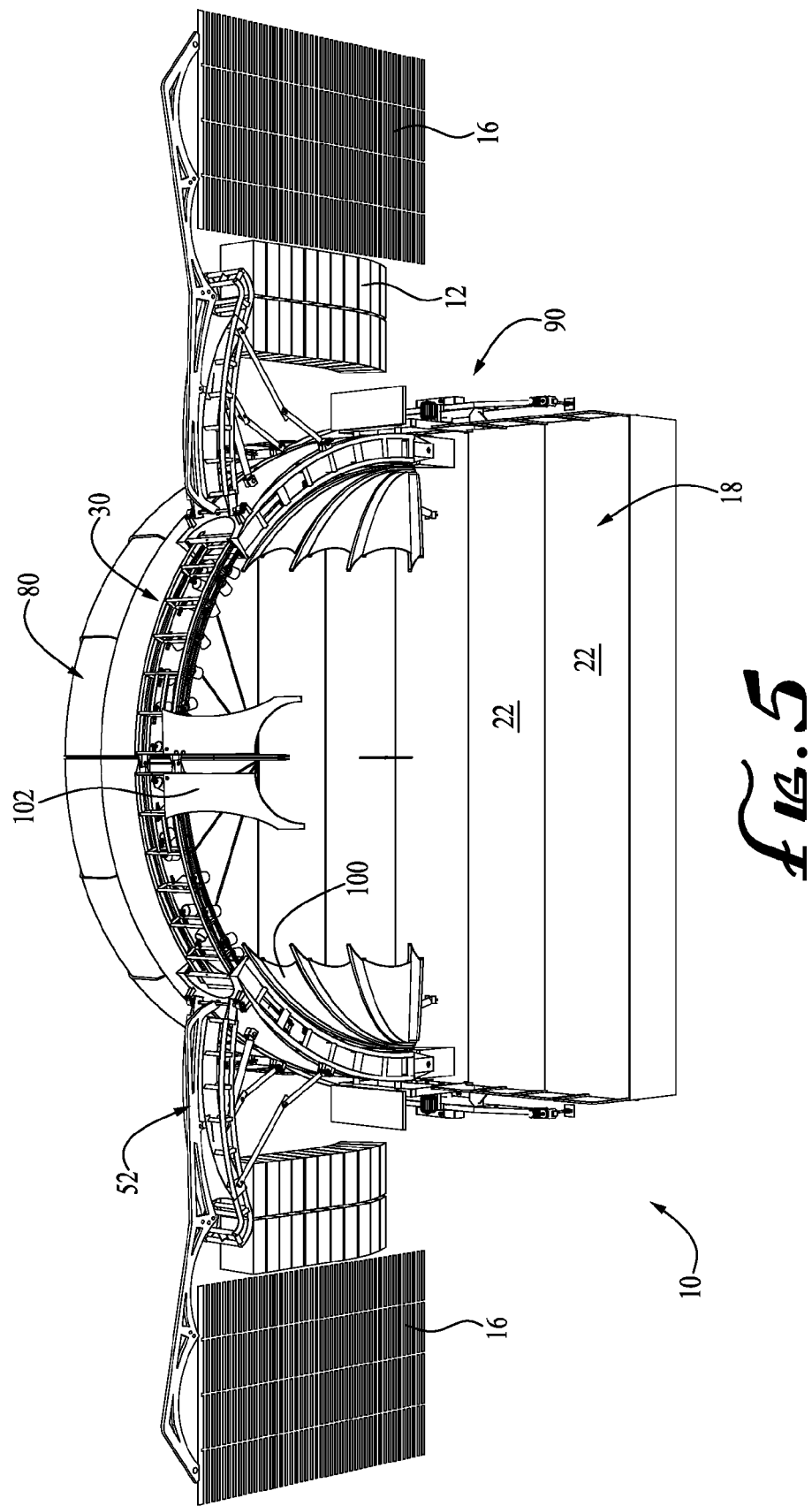
FIG. 5 is a front top isometric view of the mobile arched telescopic deployable stage system of FIG. 1.

FIG. 1 is front view of an exemplary embodiment of a mobile arched telescopic deployable stage system 10 of the invention in its fully deployed state. FIG. 2 is a cross-sectional view through view lines 2-2 of FIG. 1 and FIG. 3 is a detail view of the area shown in circled areas 3-3 of FIG. 1. FIG. 4 is a front top right isometric view, FIG. 5 is a front top isometric view, FIG. 6 is a rear top right isometric view, FIG. 7 is a rear top isometric view, FIG. 8 is a left side view, and FIG. 9 is a top view of the mobile arched telescopic deployable stage system 10.

Figure 15:
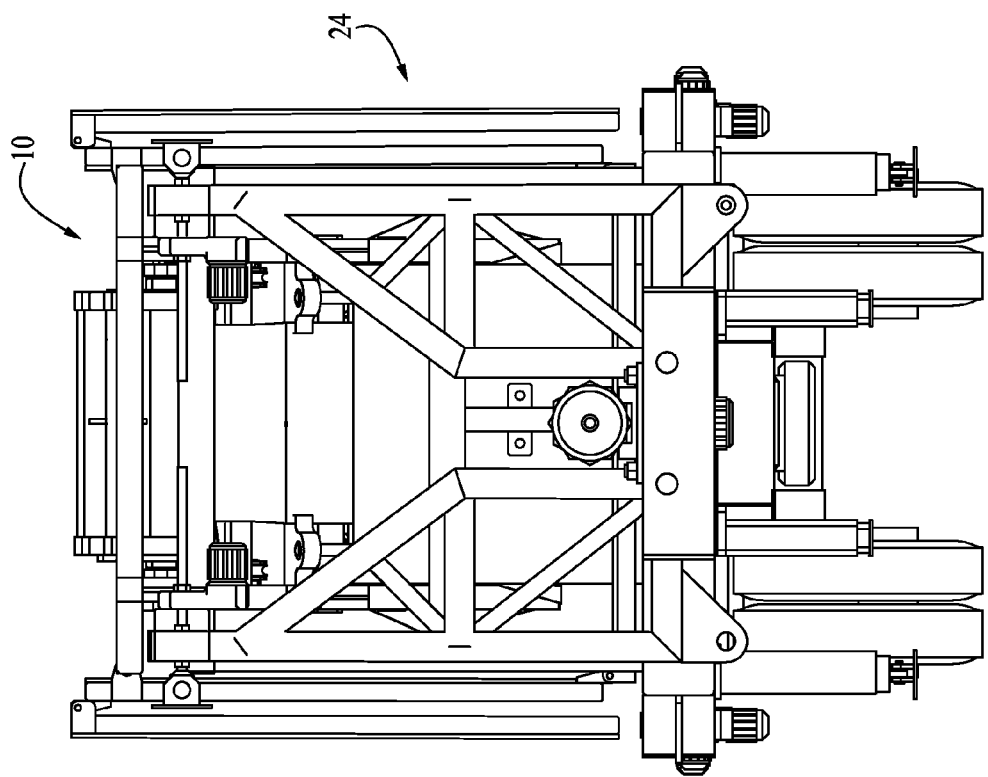
FIG. 15 is a front view showing the exemplary mobile arched telescopic deployable stage system in an undeployed state in a truck trailer of FIG. 10.

FIG. 10 is a partially revealed view showing the mobile arched telescopic deployable stage system 10 in an undeployed state in a truck trailer 24. FIGS. 11-15 are various views of the exemplary mobile arched telescopic deployable stage system 10 in an undeployed state in a truck trailer of FIG. 10. FIG. 11 being a right top isometric view, FIG. 12 is a top isometric view, FIG. 13 is a right side view, FIG. 14 is a bottom view, and FIG. 15 is a front view. The truck trailer 24 has a chassis 26 with permanently mounted wheels 28. The mobile arched telescopic deployable stage system 10 sits on the chassis 26. The main floor section 20 sits on the chassis 26 of the truck trailer, and with the extension floor sections 22 folded at both sides of the truck trailer 24 to form virtual sides of the truck trailer 24.

Figure 16:
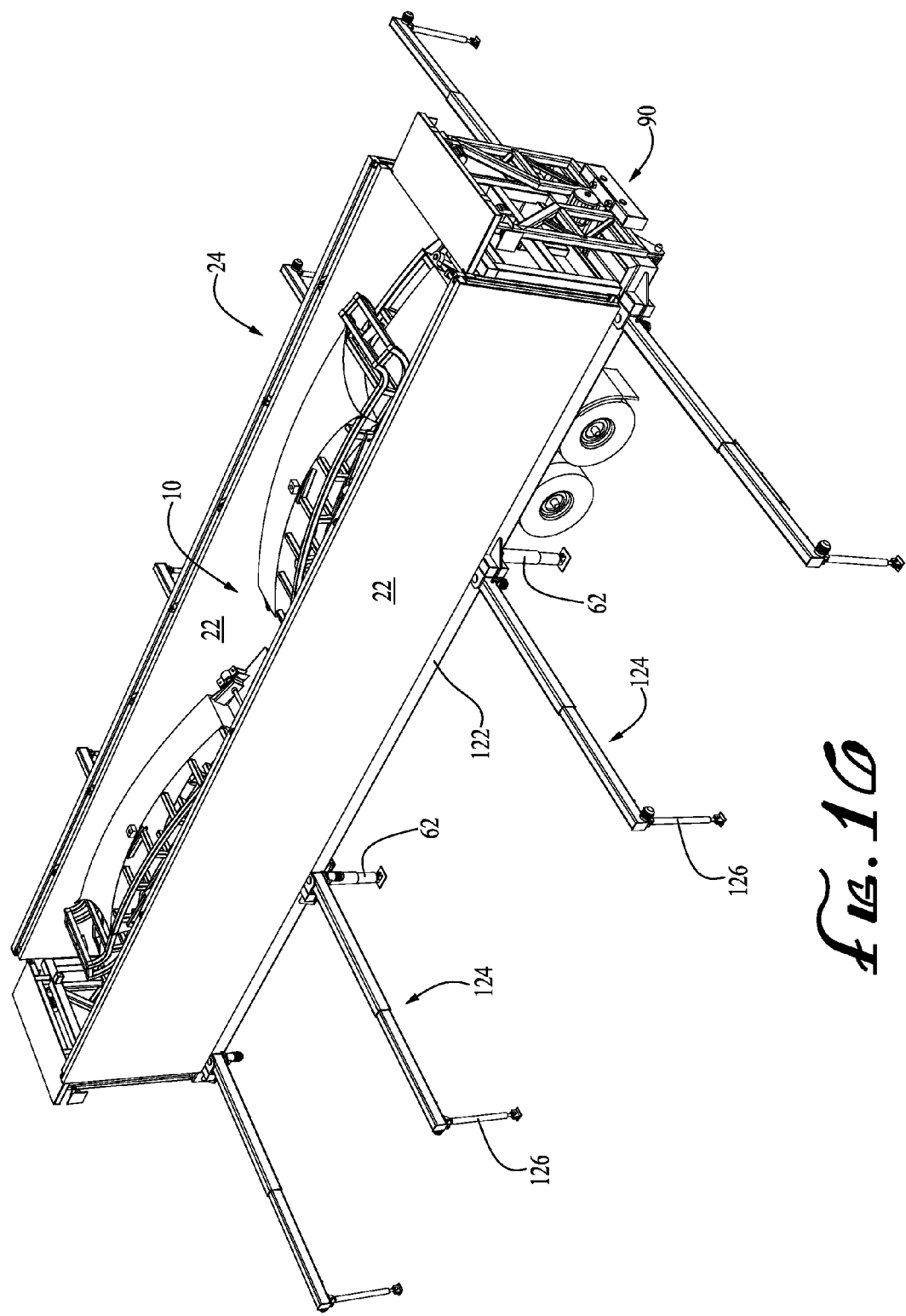
FIG. 16 is a right top isometric view showing the exemplary mobile arched telescopic deployable stage system in a partially deployed state with platform supports deployed but still mounted on a truck trailer of FIG. 10.
Figure 17:
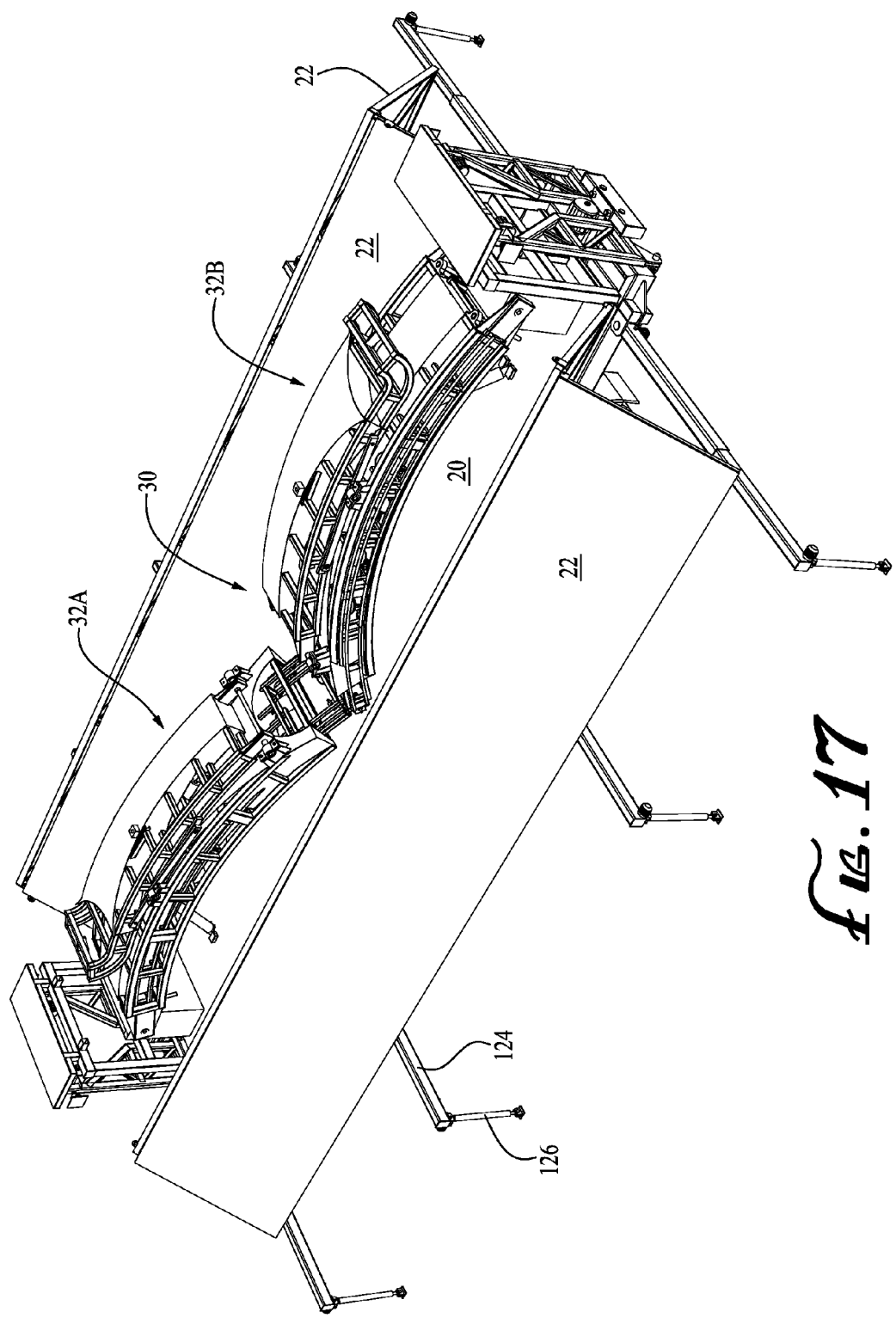
FIG. 17 is a right top isometric view showing the exemplary mobile arched telescopic deployable stage system in a partially deployed state with extension floor panels in the process of being unfolded and lowered and with the truck trailer withdrawn.
Figure 18:
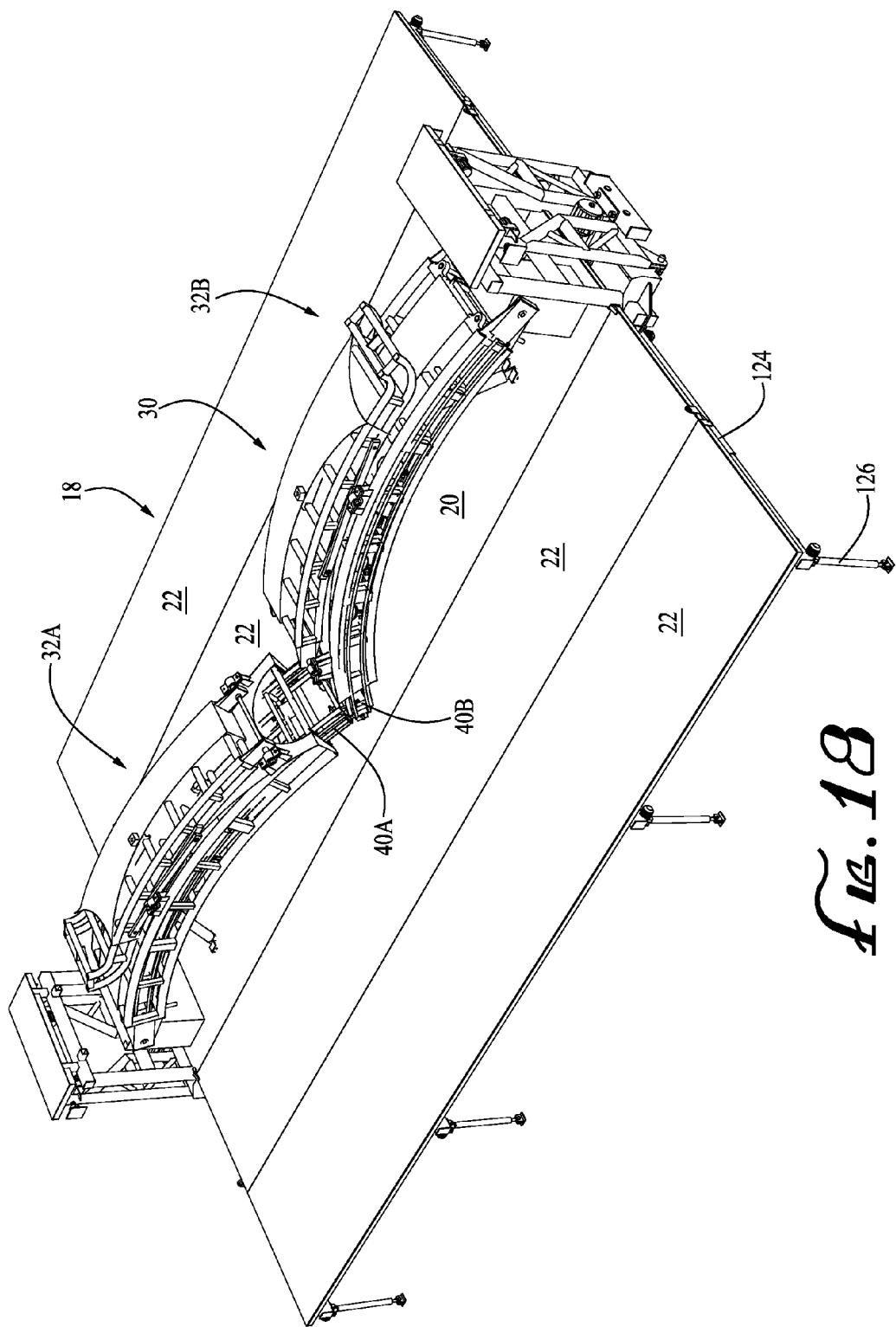
FIG. 18 is a right top isometric view showing the exemplary mobile arched telescopic deployable stage system in a partially deployed state with the extension floor panels fully deployed.
Figure 19:
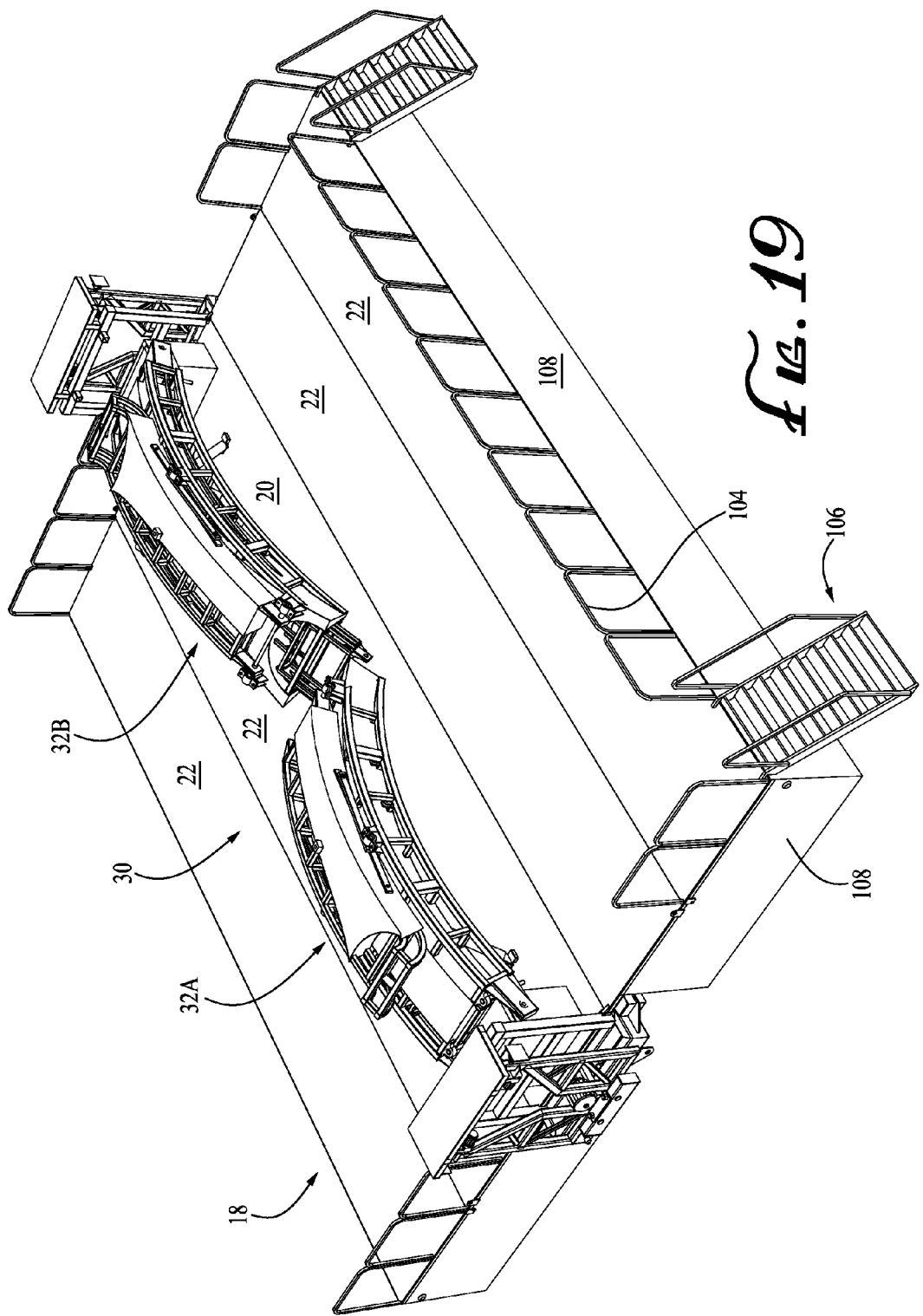
FIG. 19 is a right top isometric view showing the exemplary mobile arched telescopic deployable stage system in a partially deployed state with the extension floor panels fully deployed and with guard rails and stairs added.
Figure 20:
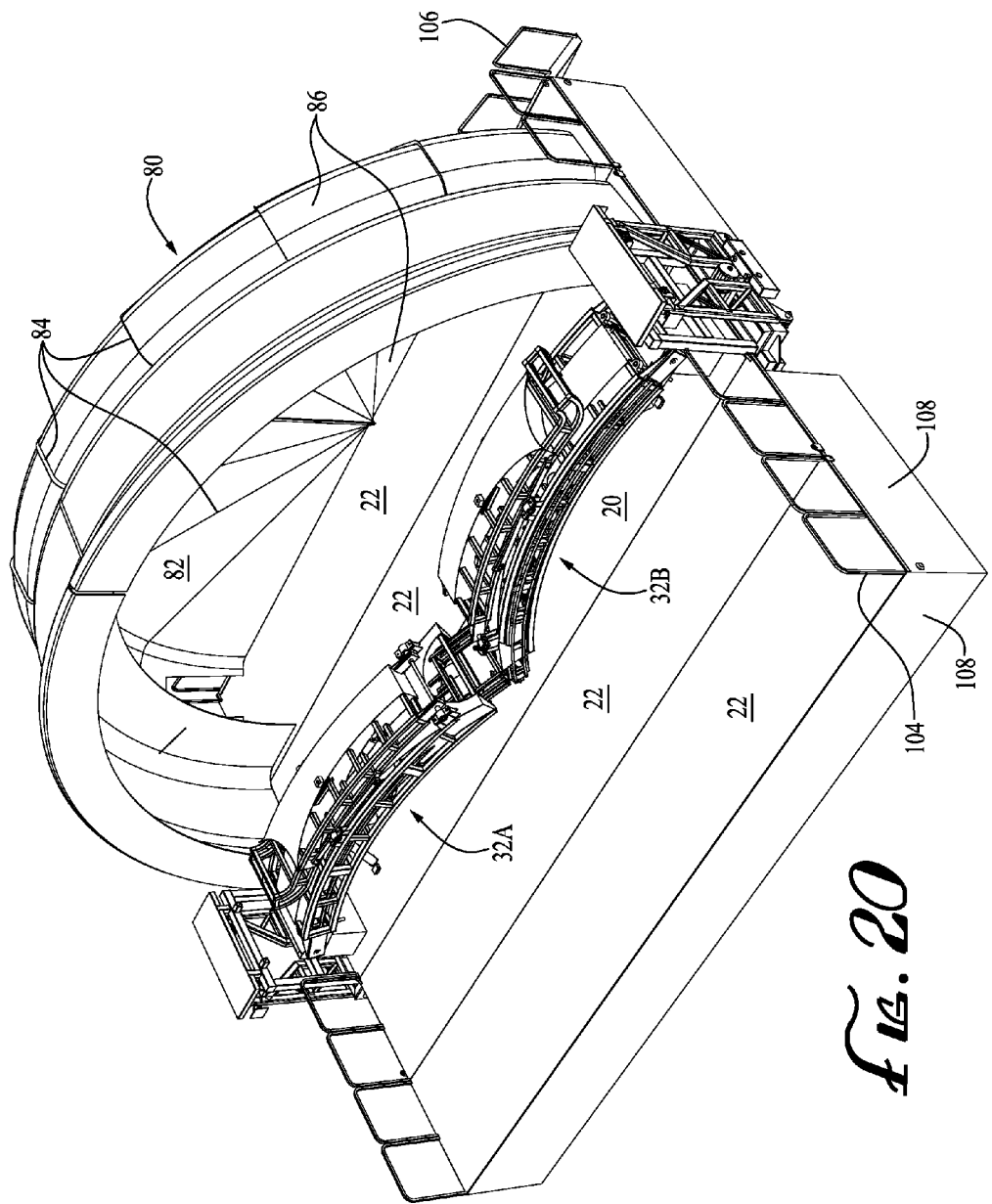
FIG. 20 is a right top isometric view showing the exemplary mobile arched telescopic deployable stage system in a partially deployed state with a rear stage backdrop shown in a deployed state.
Figure 21:
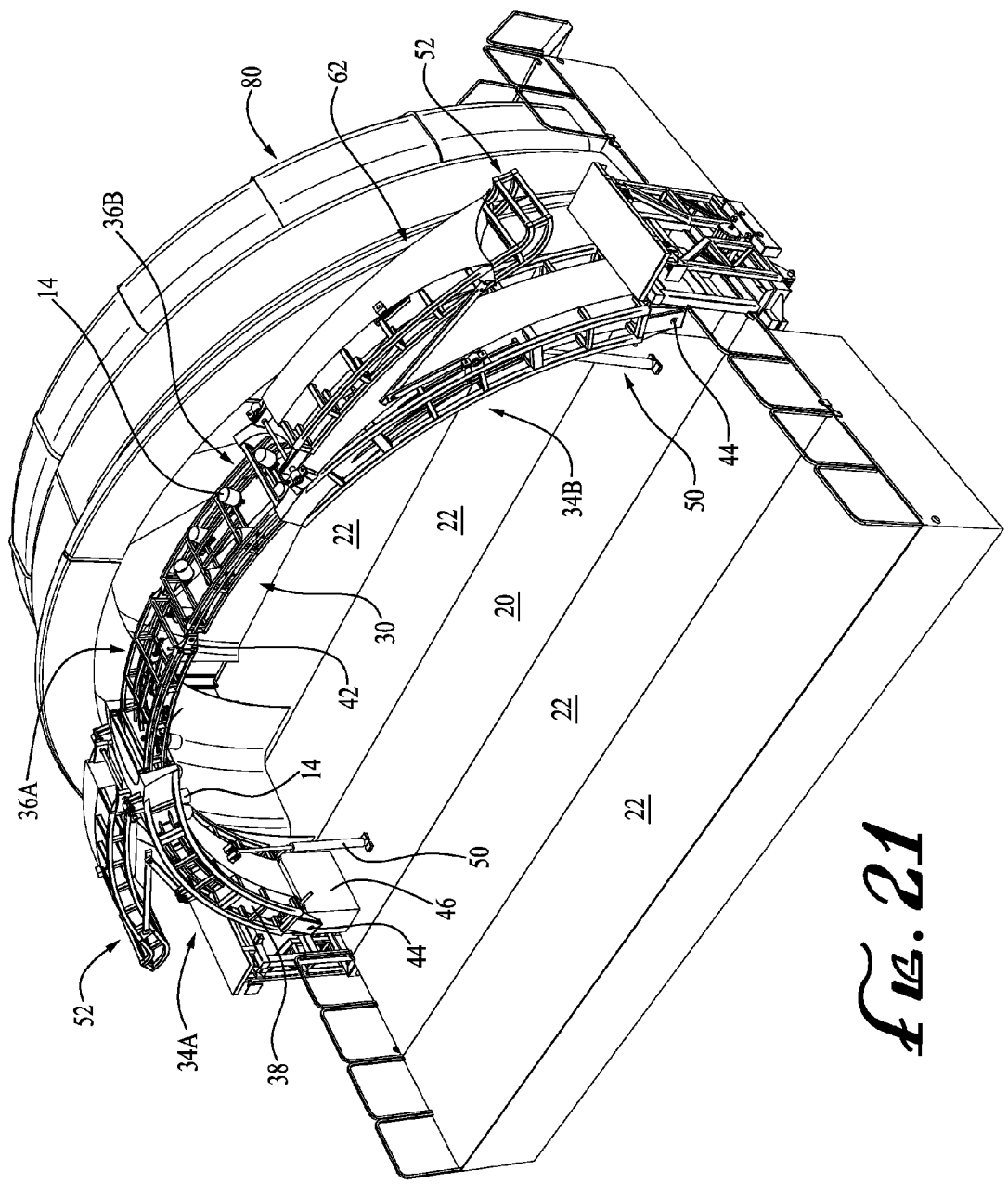
FIG. 21 is a right top isometric view showing the exemplary mobile arched telescopic deployable stage system in a partially deployed state with its telescopic arched frame main trusses raised but with its arched support arms partially deployed.
Figure 22:
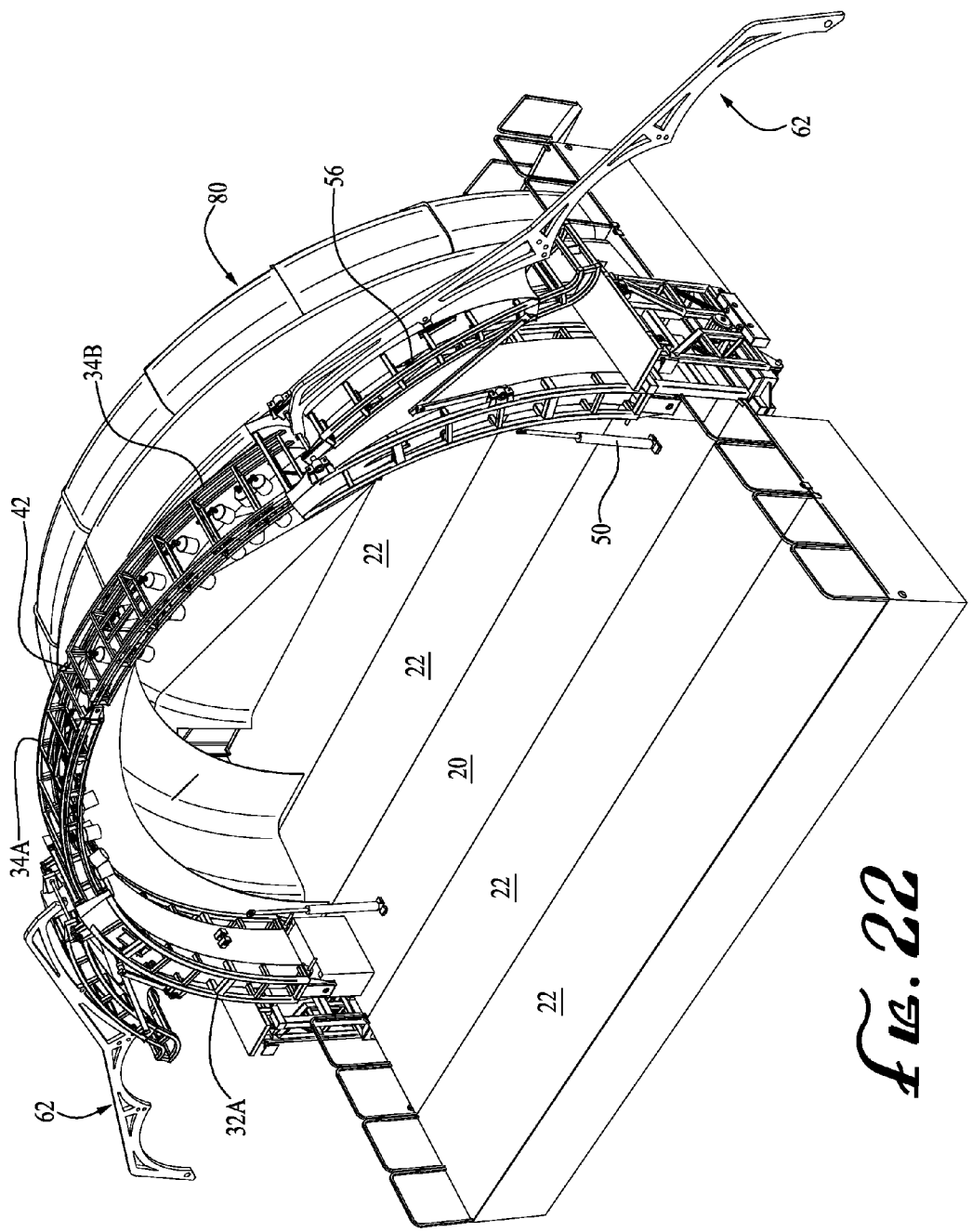
FIG. 22 is a right top isometric view showing the exemplary mobile arched telescopic deployable stage system in a partially deployed state with its telescopic arched frame main trusses raised but with its arched support arms further deployed.
Figure 23:
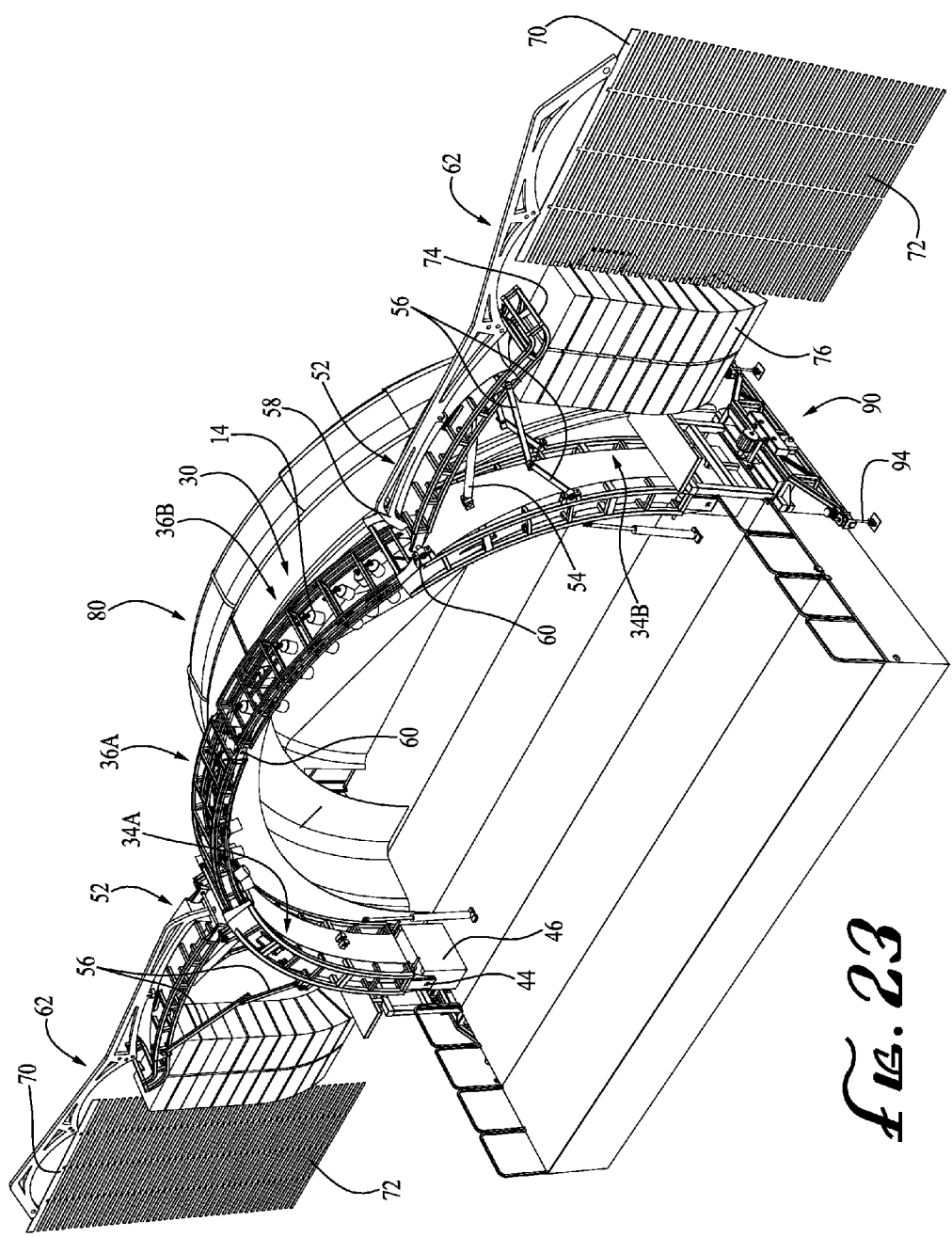
FIG. 23 is a right top isometric view showing the exemplary mobile arched telescopic deployable stage system in a fully deployed state carrying speakers, lights, and display screens.
Figure 24:
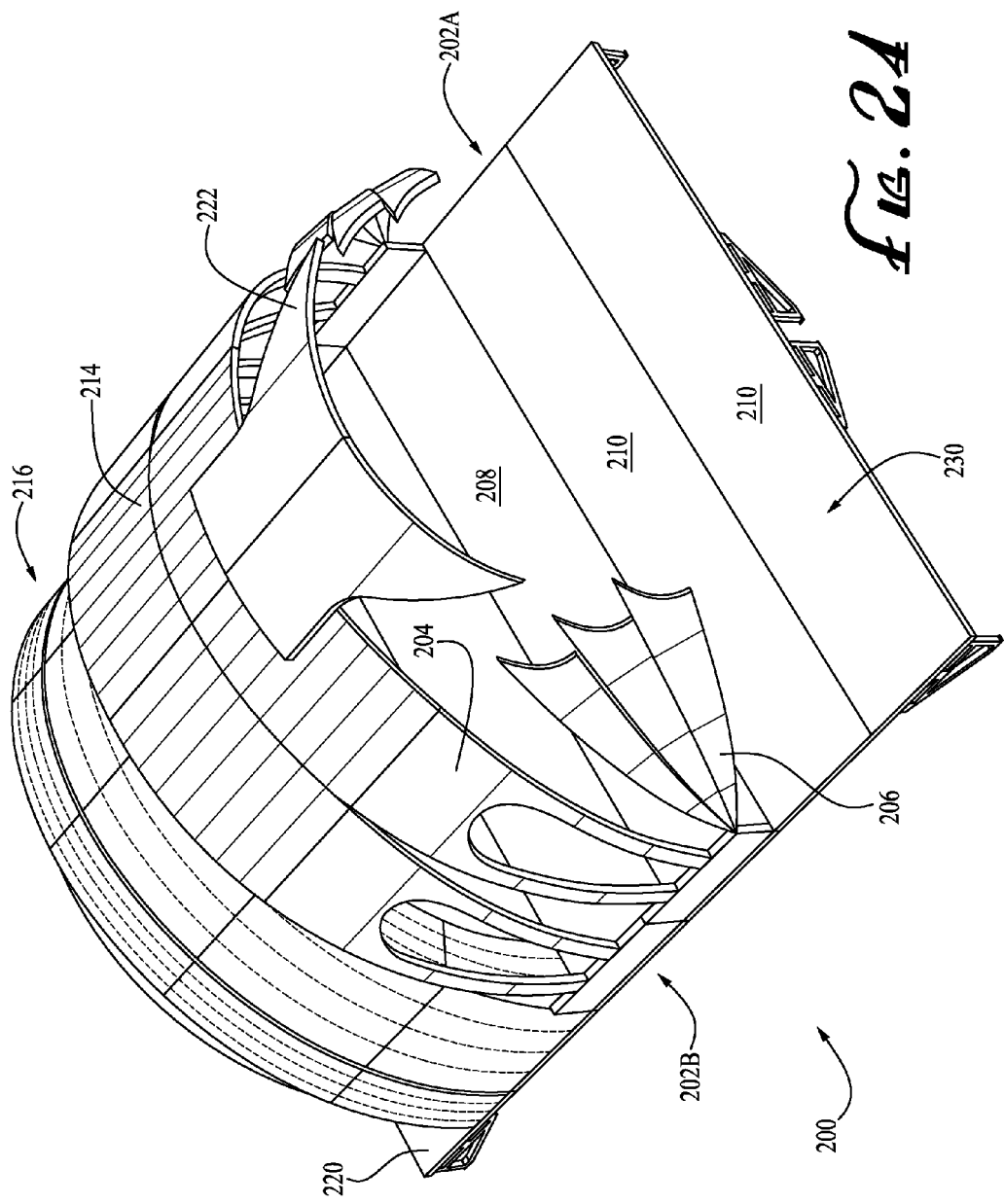
FIG. 24 is a top left isometric view of an exemplary deployable dual stage system.

FIGS. 16-23 are various views of the exemplary mobile arched telescopic deployable stage system 10 as it transitions from first starting to being deployed to being fully deployed. FIG. 16 is a right top isometric view showing the mobile arched telescopic deployable stage system 10 with platform supports  deployed but still mounted on a truck trailer . FIG. 17 is a right top isometric view showing the mobile arched telescopic deployable stage system 10 with the extension floor sections 22 in the process of being unfolded and lowered from the main floor section 20 and with the truck trailer withdrawn. FIG. 18 is a right top isometric view showing the mobile arched telescopic deployable stage system 10 with the extension floor panels 22 fully deployed to form the stage portion 20. FIG. 19 is a right top isometric view showing the mobile arched telescopic deployable stage system 10 with guard rails , stairs , and stage skirting ** deployed. FIG. 20 is a right top isometric view showing the mobile arched telescopic deployable stage system 10 in with a rear stage backdrop shown in a deployed state. FIG. 21 is a right top isometric view showing the mobile arched telescopic deployable stage system 10 with its arched frame portion 30 raised but with its deployable accessory arms 52 only partially deployed. FIG. 22 is a right top isometric view showing the mobile arched telescopic deployable stage system 10 state with its arched frame portion 30 raised but with its deployable accessory arms 52 further deployed. Lastly, FIG. 23 is a right top isometric view showing the mobile arched telescopic deployable stage system 10 in a fully deployed state carrying speakers 12, spotlights 14, and display screens 16.

The mobile arched telescopic deployable stage system 10 is shown carrying stacks of speakers 12, spotlights 14, and display screens 16. The mobile arched telescopic deployable stage system 10 has a stage portion 18, that is formed of a main floor section 20 and a plurality of extension floor sections 22 that are hinged together and/or to the main floor section 20, when extension floor sections 22 and are laid out flat when fully deployed, as shown in the figures. An arched frame portion 30 is formed for two main trusses 32A and 32B.

The two main trusses 32A and 32B in turn are made up of lower telescoping truss sections 34A and 34B, each having an upper telescoping truss section 36A and 36B, respectively. The lower telescoping truss sections 34A and 34B and corresponding upper telescoping truss sections 36A and 36B are moveably engaged with each other. For example, the upper telescoping truss sections 36A and 36B can have smaller profiles and arched shape that at least partially slideably fits within a tunnel 38 formed in the lower telescoping truss sections 34A and 34B, so that the upper telescoping truss sections 36A and 36B will roll out of the tunnels 38 and be capable of rolling out relative thereto. In lieu of the upper telescoping truss sections 36A and 36B completely fitting within the lower telescoping truss sections 34A and 34B, the lower telescoping truss sections 34A and 34B can have rails and/or partially enclose the upper telescoping truss sections 36A and 36B so that accessories, e.g., lights attached to a top surface of the upper telescoping truss sections 36A and 36B will not be impinged upon by the lower telescoping truss sections 34A and 34B. Extending ends 40A and 40B of the upper telescoping truss sections 36A and 36B are preferably pivotally attached together by a pivot 42 (see FIGS. 21 and 22). Lower ends 44 of the lower telescoping truss sections 34A and 34B are pivotally attached to truss supports 26, which truss supports 26 can extend from ends of the stage portion 18. The two main trusses 32A and 32B are raised from an undeployed state, e.g., see for example FIGS. 18-20, to a raised state, see for example FIGS. 21-23, by raising devices 50. The raising device 50 can comprise hydraulic, pneumatic, electromechanical, or other motive devices. As the two main trusses 32A and 32B are deployed from their undeployed state to the deployed state, the upper telescoping truss sections 36A and 36B will roll out of the tunnels 38 in the lower telescoping truss sections 34A and 34B, with the upper telescoping truss sections 36A and 36B pivoting relative to each other as necessary. Once the arched frame portion 30 is fully deployed, the lower telescoping truss sections 34A and 34B and the upper telescoping truss sections 36A and 36B can be locked relative to each other to retain the arched shaped, and no longer require additional motive force applied by the raising devices 50. In embodiments wherein the upper telescoping truss sections 36A and 36B slide from the tunnel 38 contained in the lower telescoping truss sections 34A and 34B, it is possible for a wide variety of accessories to be mounted on the upper telescoping truss sections 36A and 36B and the lower telescoping truss sections 34A and 34B, such as spotlights 14. The spotlights 14 can be motorized and integrated by the system so the direction of the light, light color, effects, timing, etc. can be controlled by users. As best shown in FIGS. 3, and 21-23, in addition, the arched frame portion 30 can include deployable accessory arms 52 that deploy with linkage arms 54 and raising devices 56 are moved to an undeployed position were the accessory arms 52 are close to lower telescoping truss sections 34A and 34B (see FIG. 18), to a partially disclosed state (see FIG. 22) and finally to a fully deployed state (see FIG. 23.) In the locked position, the linkage arms 54 can be locked in place. Lower ends 58 of the deployable accessory arms 52 are pivotally attached to the lower telescoping truss sections 34A and 34B by pivots 60. The accessory arms 52 can further include extensions 62 attached to the accessories arms 52, which extensions 62 can have hinged halves that unfold, e.g., from the state shown in FIG. 21, to the state shown in FIG. 22. A frame 70 is available for suspending features, such as big screen displays 16. The extensions 62 of the deployable accessory arms 52 can also include supports 74 for other accessories, such as stacks of speakers 12. As shown in FIGS. 20-23, a deployable arched backdrop 80 structure with back screen 82 is preferably provided. The deployable arched backdrop 80 structure with back screen 82 preferably include a deployable frame of struts 84 with material 86 attached thereto. The material 86 can be fabric, plastic, or even panels of material that are located between the struts 84. The deployable arched backdrop 80 structure with back screen 82 is preferably in a folded flat state, e.g., dropped down to the stage portion 18 when the mobile arched telescopic deployable stage system 10 is being shipped or in storage. After the arched frame portion 30 is deployed, then the arched backdrop 80 structure with back screen 82 will be deployed.

The mobile arched telescopic deployable stage system 10 has end structures 90 at opposite sides of the stage portion 18 next to the main floor section 20. The end structures 90 include droppable legs 92 with feet 94, which droppable legs 92 are moved by a motor 96. The droppable legs 92 with feet 94 are preferably self-leveling to maintain the stage portion 18 completely flat when deployed. The end structures 90 can include a covering 98. The mobile arched telescopic deployable stage system 10 can include an optional deployable front covers 100 and 102. Stage railings 104 and stairways 106 are attached to the stage as desired. Also, around the stage portion 18, stage skirting 108 can be added for aesthetic reasons and to prevent unauthorized access under the stage portion 18. Stage supporting structures 120 are provided and are hingeably attached a main stage framework 122. The stage supporting structures 120 have extendable horizontal beams 124 and generally vertical legs 126 which are dropped to support the stage portion 18. The stage supporting structures 120 will preferably be self-leveling and can include hydraulic, pneumatic, electromechanical, etc. devices to provide for raising and lowering as required.

FIG. 10 is a partially revealed view showing the mobile arched telescopic deployable stage system in an undeployed state on a truck trailer 24.

FIGS. 11-15 are various views of the exemplary mobile arched telescopic deployable stage system 10 in an undeployed state in a truck trailer 24 of FIG. 10. FIG. 11 is a right top isometric view, FIG. 12 is a top isometric view, FIG. 13 is a right side view, FIG. 14 is a bottom view, and FIG. 15 is a front view. The chassis 26 and wheels 28 of the truck trailer 24 are shown, with the mobile arched telescopic deployable stage system 10 sitting atop the truck trailer 24. With the mobile arched telescopic deployable stage system 10 sitting atop the truck trailer 24, the two extension floor sections 22 are hingeably attached to the main floor section 20 and the two extension floor sections 22 form sides. While the top is being shown as open, during transportation and storage, the top can be covered if desired.

FIGS. 16-23 are various views of the mobile arched telescopic deployable stage system 10 as it transitions from first starting to being deployed to being fully deployed. FIG. 16 is a right top isometric view showing the mobile arched telescopic deployable stage system 10 with stage supporting structures 120 deployed but with the mobile arched telescopic deployable stage system 10 still mounted on a truck trailer 24. The extendable horizontal beams 124 and vertical legs 126 are shown in their deployed state, with the extendable horizontal beams 124 extending from the main stage framework 122. FIG. 17 is a right top isometric view showing the mobile arched telescopic deployable stage system 10 with the extension floor sections 22 in the process of being unfolded and lowered from the main floor section 20 and with the truck trailer withdrawn. FIG. 18 is a right top isometric view showing the mobile arched telescopic deployable stage system 10 with the extension floor panels 22 fully deployed to form the stage portion 20. In FIG. 19, the stage railing 104, stairways 106, and stage skirting 108 are engaged with the stage portion 18. FIG. 20 is a right top isometric view showing the mobile arched telescopic deployable stage system 10 with the rear stage backdrop 80 shown in a deployed state. FIG. 21 is a right top isometric view showing the mobile arched telescopic deployable stage system 10 with its arched frame portion 30 raised but with its deployable accessory arms 52 only partially deployed. FIG. 22 is a right top isometric view showing the mobile arched telescopic deployable stage system 10 state with its arched frame portion 30 raised but with its deployable accessory arms 52 further deployed. Lastly, FIG. 23 is a right top isometric view showing the mobile arched telescopic deployable stage system 10 in a fully deployed state carrying speakers 12, spotlights 14, and display screens 16.

Figure 25:
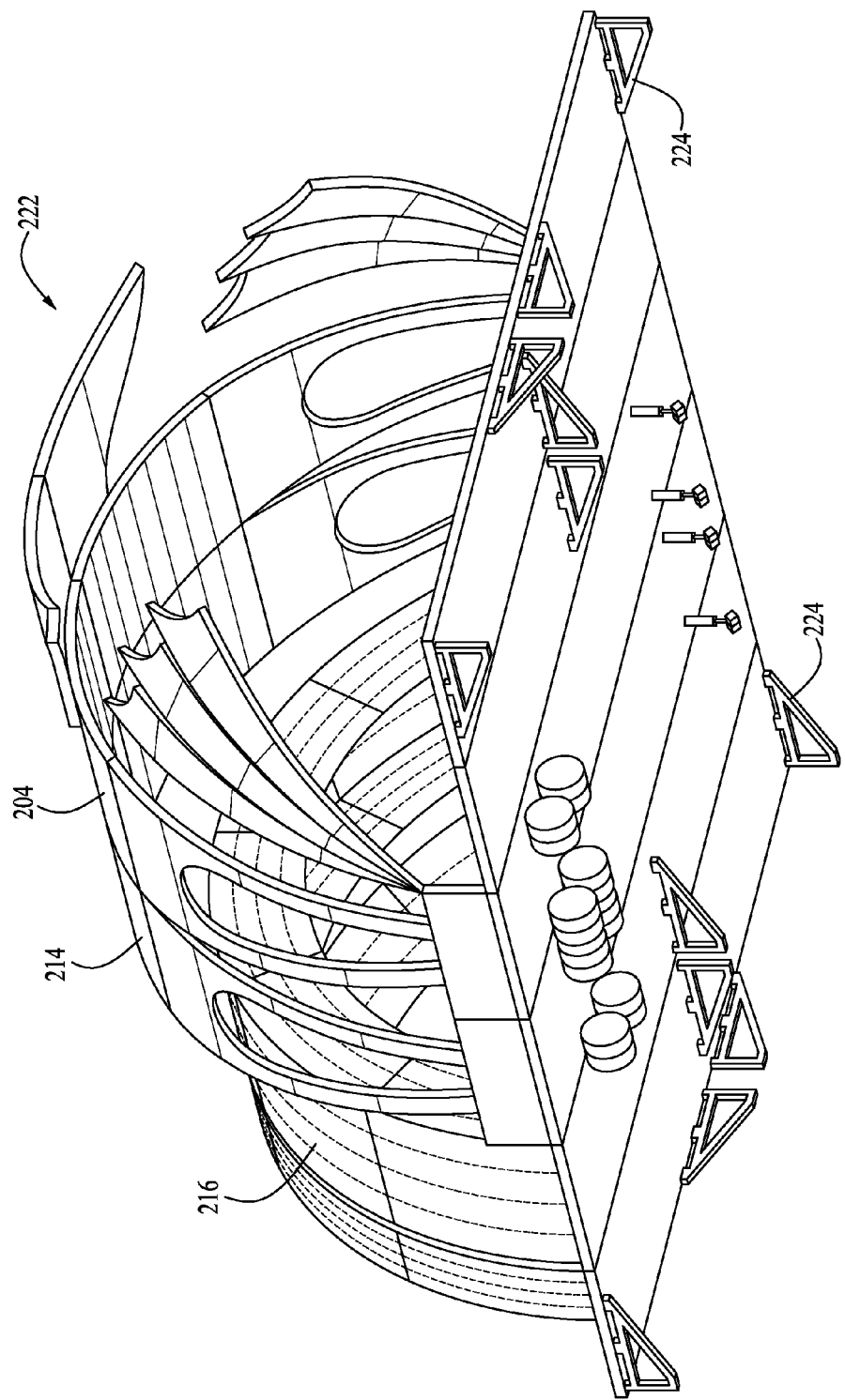
FIG. 25 is a bottom left isometric view of the deployable dual stage system of FIG. 24.
Figure 26:
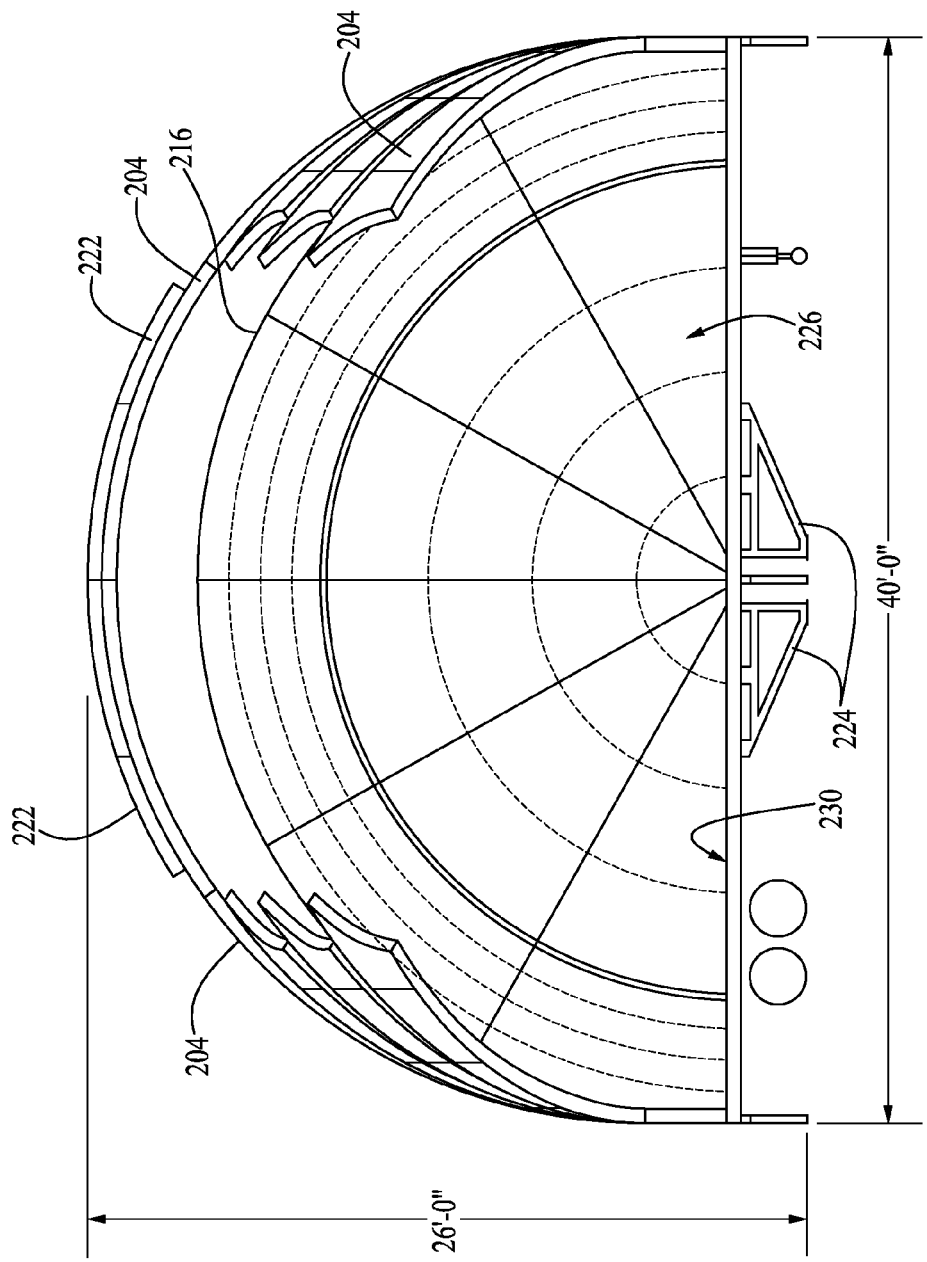
FIG. 26 is a front view of the deployable dual stage system of FIG. 24.
Figure 27:
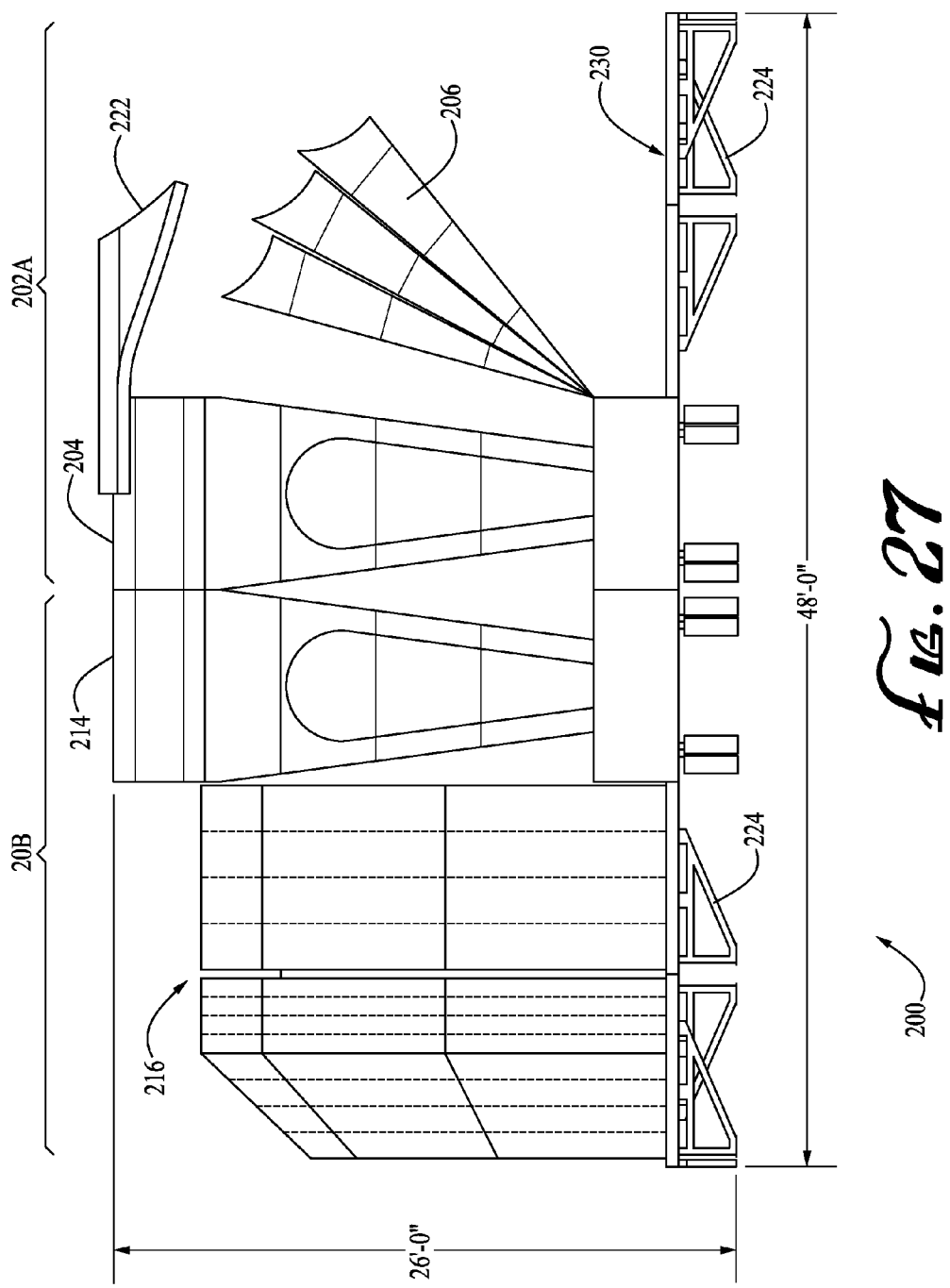
FIG. 27 is a left side view of the deployable dual stage system of FIG. 24.
Figure 28:
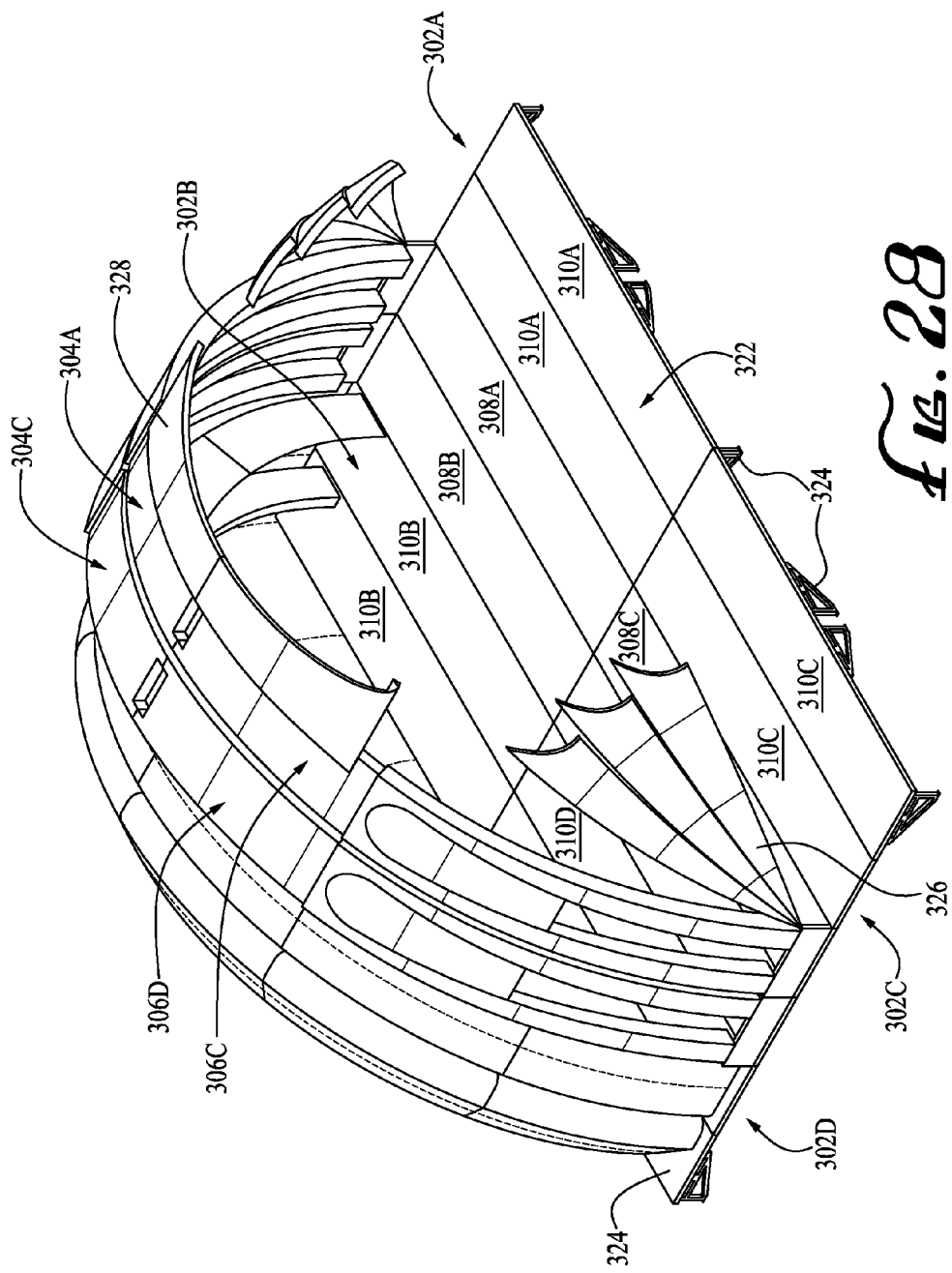
FIG. 28 is a top left isometric view of an exemplary deployable quad stage system.

Alternate deployable stage configurations can be made of two or more sections. Each portion of the deployable stage may be transported by a different semi-trailer truck to the final destination. For example, when the deployable stage configuration is assembled from two halves, the trailers carrying each half of the stage are backed up in position, side-by-side or end-to-end, and the two structural halves are spliced together before deployment of the support leg system. FIGS. 24-27 are various views of another deployable stage system 200 that combines sections carried on two truck trailers, referred herein as a "dual stage system." In this dual stage system, the two main sections 202A and 202B carried by two truck trailers are different, and the main sections 202A and 202B are arranged lengthwise in a side-by-side orientation. For example, main section 202A carried a front arched frame portion 204, accessories wings 206, a main floor section 208 from which are mounted the first, front arched frame portion 204 and the accessories wings 206, and deployable extension floor sections 210, which extension floor sections are hingeably attached to each other and to the main floor section 208. The front arched frame portion 204 can be in the same form as the arched frame portion 30 described above, e.g., formed of two main trusses each of which is formed of lower and upper telescoping truss section, which are raised during deployment. The main section 202B carried a rear arched frame portion 214, a deployable arched canopy 216, a main floor section 218, and deployable extension floor sections 220, which extension floor sections are hingeably attached to each other and to the main floor section 218. The rear arched frame portion 214 can be in the same form as the arched frame portion 30 described above, e.g., formed of two main trusses each of which is formed of lower and upper telescoping truss section, which are raised during deployment. As with the mobile arched telescopic deployable stage system 10 described above, the dual stage system 200 can include a deployable cover 222. When the two main sections are joined together, the main floor sections 208 and 218 and the deployable extension floor sections 210 and 220 form the completed stage 230. As best shown in FIGS. 25 and 26, the completed stage 230 and parts attached thereto are supported by legs 224. The deployable arched canopy 216 preferably includes a back screen 226. Like the mobile arched telescopic deployable stage system 10, the dual stage system 200 can include deployable arms and brackets for carrying stacks of speaker, big screen display, and lighting, and other accessories (not shown.) The operation of the dual stage system 200 can be deployed and operated similarly to the mobile arched telescopic deployable stage system 10.

There is practically limit on the number of portions that can be spliced together side-by-side or end-to-end to create a "tunnel-like" deployable stage. The two or more deployable stage halves can be deployed side-by-side or end-to-end to attach to one another by a bolted splicing system to form a larger deployable stage for larger applications. For this configuration, the standing platform wings are only attached to the outer side of the spliced main central frames.

In some of these alternate configurations, the covered rear is entirely removed from some of the halves of the structures, and left in place on the other spliced structures.

Figure 29:
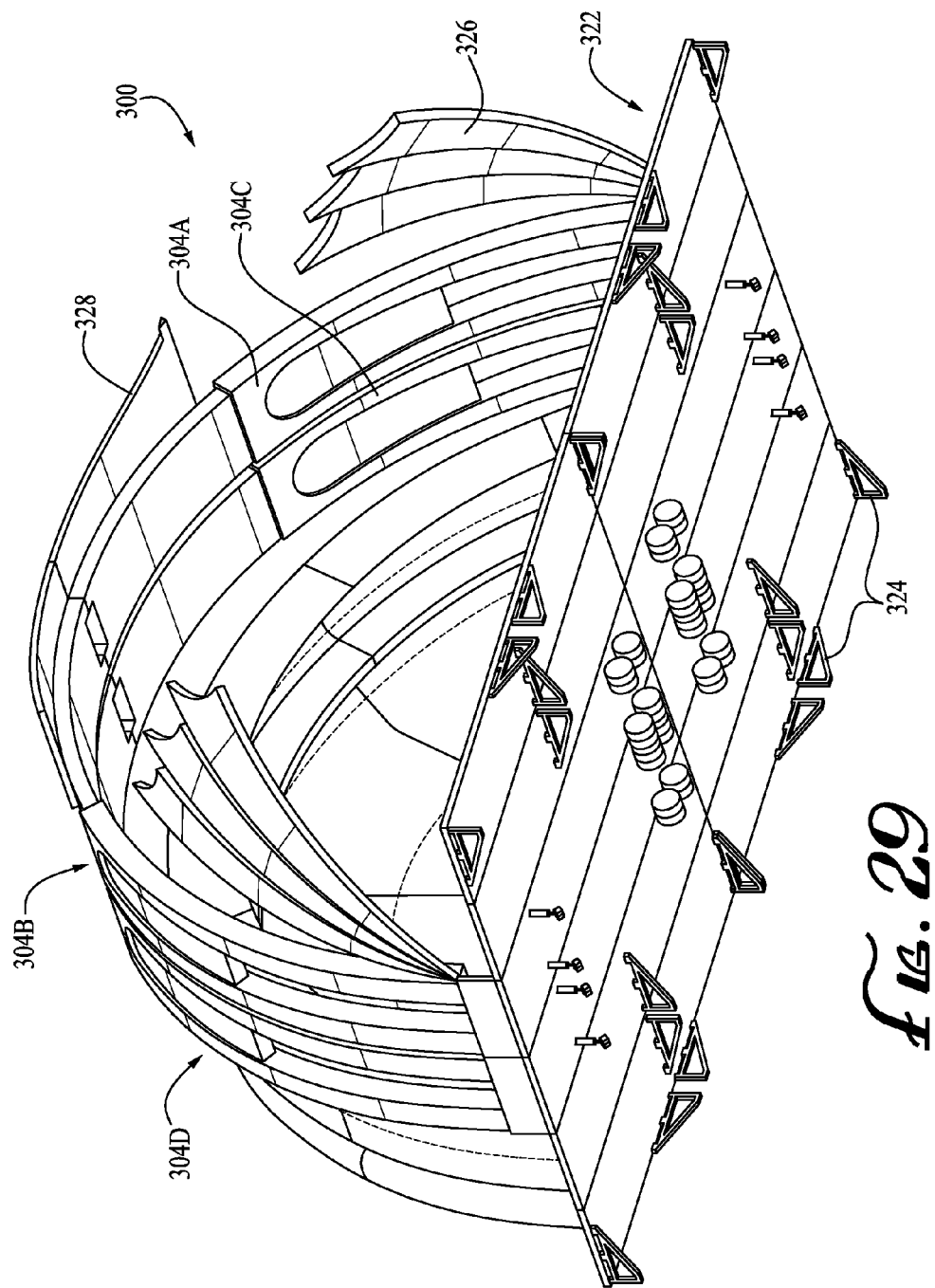
FIG. 29 is a bottom left isometric view of the deployable quad stage system of FIG. 28.
Figure 30:
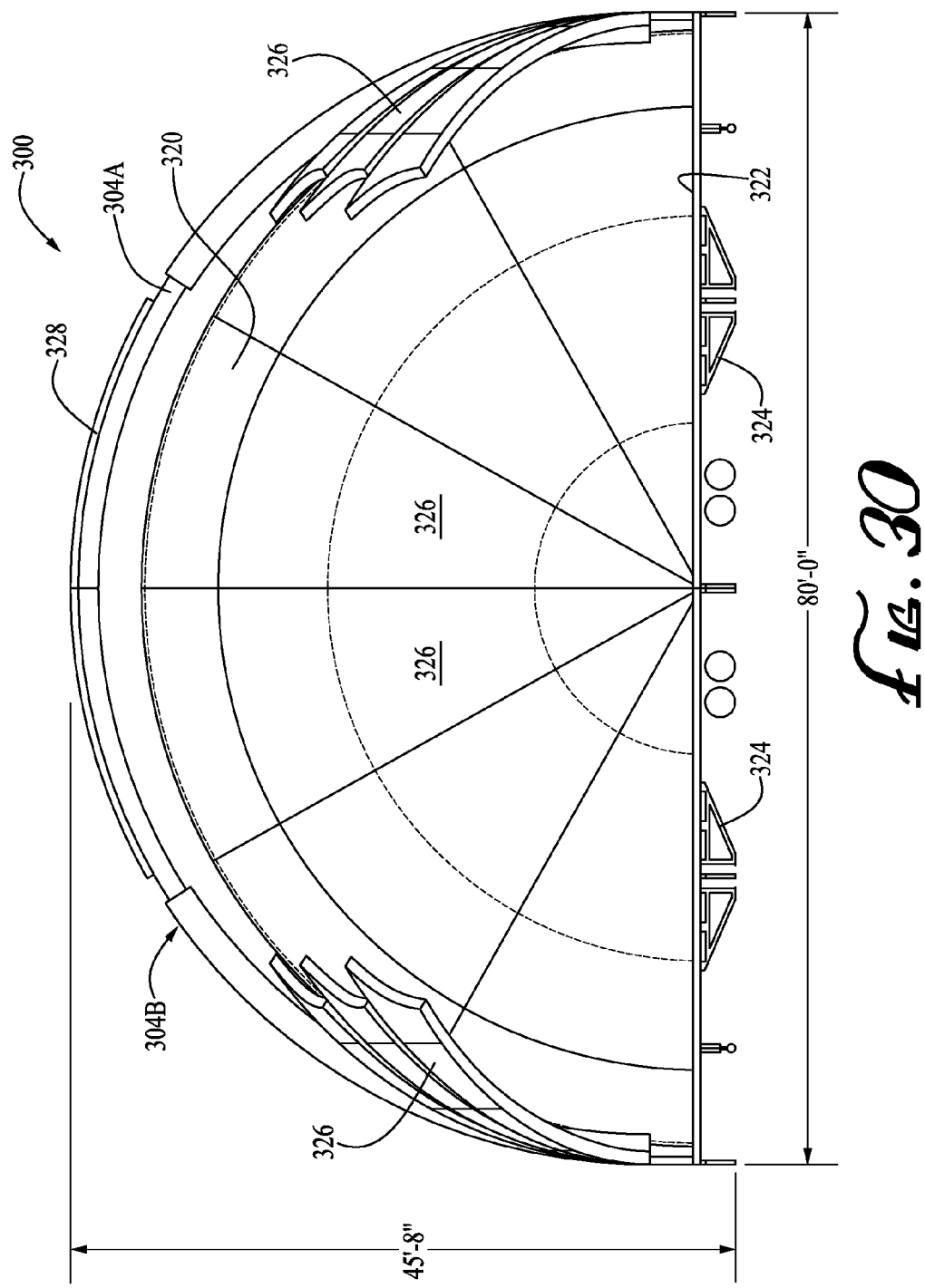
FIG. 30 is a front view of the deployable quad stage system of FIG. 28.

FIGS. 28-31 are various views of another embodiment of the deployable stage system 300 that combines sections carried on four truck trailers, referred herein as a "quad stage system." In this quad stage system 300, the four main sections 302A, 302B, 302C, and 302D are carried by four truck trailers and are all different, and the main sections 302A, 302B, 302C, and 302D are arranged both end-to-end and lengthwise in a side-by-side orientation. For example, main section 302A carries a front right arched frame portion 304A, and main section 302C carried a front left arched frame portion 306C. The front right arched frame portion 304A and the front left arched frame portion 306C can in turn each include upper and lower telescoping sections (not shown), with the upper telescoping sections adapted to be hingeably joined together at the assembly site of the quad stage system 300 to form an arch that is twice as long and twice as high as would be capable compared to the dual stage system 100 or the mobile arched telescopic deployable stage system 10. Similar devices as described above are used to deploy the front right arched frame portion 304 and the front left arched frame portion 306. The main section 302A has a main floor section 308A and extension floor sections 310A, which extension floor sections 310A are deployed at the site. Similarly, main section 302B has a main floor section 308B and extension floor sections 310B, main section 302C has a main floor section 308C and extension floor sections 310C, and main section 302D has a main floor section 308D and extension floor sections 310D. Main section 302B carries a rear right arched frame portion 304B, and main section 302D carried a rear left arched frame portion 306D. The rear right arched frame portion 304B and rear left arched frame portion 306D are joined and deployed as with the front right arched frame portion 304A and the front left arched frame portion 306C. An accessory deployable cover 312 can be made to extend from the front right arched frame portion 304A and the front left arched frame portion 306C. The main sections 302B and 302D carry a deployable arched canopy 320 that can be formed of two halves, each carried on one of the main sections 302B and 302D. When the two main sections are joined together, the main floor sections 208 and 218 and the deployable extension floor sections 210 and 220 form the completed stage 322. As best shown in FIGS. 29-31, the completed stage 322 and parts attached thereto are supported by legs 324. The deployable arched canopy 320 preferably includes a back screen 326. The quad stage system 300 can include accessories wings 326 on the front sides, and an extension cover 328 that extends over the stage Like the mobile arched telescopic deployable stage system 10, the quad stage system 300 can include deployable arms and brackets for carrying stacks of speaker, big screen display, and lighting, and other accessories (not shown.) The operation of the dual stage system 300 can be deployed and operated similarly to the mobile arched telescopic deployable stage system 10 and dual system 200, except of course that four separate sections 302A, 302B, 302C, and 302D need to be arranged, joined up, and deployed to form the larger stage and arched cover.

Operation of the Deployable Telescopic Stage. The mobile arched telescopic deployable stage system 10, dual system 200, and quad system 300 ("stage system") can be operated by a system of hydraulic pistons, pneumatic pistons, mechanical systems, pumps, electric motors, combustion/compression motors, oil reservoir, hydraulic lines, cable/pulley mechanisms, and computers, to expand and make operational, and to contract and make transportable the stage system. The electrical and digital controls operate the whole deployable stage system via a computer screen, or any other smart computerized terminal or tablet computer. The stage preferably includes an intelligent, computer operated, leveling system that allow end users to level the platform with accuracy and ease of function.

Electrical systems. The stage system has an electrical system, which controls the hydraulic systems, the pneumatic systems, cable/pulley systems, and mechanical systems. The electrical system consists of one (or more) control panels with controls for the operation of one (or all) the systems to make the deployable stage fully functional. The controls of this deployable stage is via a wired control panel, or a remote control wireless unit, with one, or more control buttons, switches, and speed control dials. The electrical wiring of this deployable stage is carried to all its intended/designed points of connections via conduits, or via cable trays, hidden or exposed. The electrical system consists of all the necessary relays, switches, motors, outlets, inlets, breakers, panels, wiring, wiring protecting tubes, and any other electrical, analog or digital, item that is necessary to make a complete electrical system. Wiring of different gauges will be used to interconnect all electrical elements to make a complete system.

Central Hydraulic, Pneumatic, Mechanical, and Electrical Connectivity Panel. The stage has a central electrical connectivity system with all the necessary outlets, switches, connectors, breakers, and controls, analog or digital, for the intended user's ability to plug additional electrical systems, mechanical systems, lighting fixtures, special effects systems, and general equipment to achieve the user's intended effect and use. The operation of deploying, collapsing, or making an operative system, is controlled by a remote wireless, or wired computerized digital system(s), electronic devices, hydraulic systems, pneumatic systems, mechanical systems, manual systems, and or a combination of any of the mentioned systems.

Transportation. The stage has arched telescopic collapsible trusses that fit inside a container for transportation. Different size deployable stages fit in different size containers, ranging from a 20' standard container, 40' standard container, 45' high cube, etc., to a custom container of any desired length. The dimensions of a custom container depend on the design, and ultimate use, of the stage required by end users. The bottom of the stage has four, or more, "container-like" locking sockets that fit, and securely lock in place with a locking pin, onto the transportation trailer. This deployable stage can be transported on a single axle truck, on a multi axle semi-trailer, on a multi-axle low boy trailer, on train wagon flats, or on barges and ships over water. A truck trailer is used to transport the deployable stage structure into the place requested by the end user, to be deployed in place for the intended use. The truck trailer used to transport the stage can be rolled out from underneath the deployable stage, and pulled away. From this point on the transporting truck is no longer needed. When the system needs to be transported to a different location, the truck trailer is rolled back underneath the deployable stage. Then, the deployable stage structure is made to rest on the truck trailer, and the structure is locked in place via the "container-like" coupling locking system. All other mechanisms used to stabilize the structure, such as the structural legs, are lifted, or removed, so as to make the structure rest solely on the transporting truck trailer.

Fabrication. The stage can be made of structural steel, structural aluminum, titanium, plastic, carbon fiber, fiberglass, stainless steel, or other high strength materials. The structural pieces can be selected from square, rectangular, round, oval, "I" shape, "W" shape, "S" shape, "C"-channel, angle, and sheet metal in form. The structural pieces that make the structure of the deployable stage can either be a single structural piece, or a "space-frame" type of combination of structural pieces to provide strength, and lighter weights, to the structure. Some areas of the deployable stage structure are covered in part, or whole, in sheet metal designs and forms, canvas, and/or stretchable materials acting as canvas to cover the exposed areas. The deployable stage can be painted in different color patterns, single color, galvanized, etc. At the special request of the end user, the deployable stage can be totally, or partially, chromed. The deployable stage assembly parts are either welded, or bolted, in place to form the entire working system.

Stage Deployment. The deployable arched telescopic stage system 10 is brought to the site, as requested by the intended user, where the transporting truck trailer 24 stops. Optional container walls containing the deployable stage 10 are removed to expose the deployable stage structure and mechanisms. The first order of deployment is the hydraulic (or mechanic, pneumatic, or cable/pulley operated) system deployment of droppable legs 92 and stage supporting structures 120 ("deployable leg stands"). The legs stands can be one, or more, depending on the application. The legs are firmly assembled onto the main center frame structure of the deployable stage. The leg stands are firmly landed on the ground providing four points (or more, depending the number of legs, and on the application) of contact with the ground. The design can have multiple (one, or more legs) legs controlling, and stabilizing, the deployment of the stage. Once the legs are firmly deployed and supporting the weight of the deployable stage mechanisms, the legs are locked in place, and the truck trailer used to transport it can be slid out from underneath the deployable stage, and pulled away. Once the deployable stage 18 is firmly resting on its own mechanized legs system, the deployable stage structure is anchored with bracing cables (not shown) so as to provide support against the danger of toppling over in the event of severe weather conditions. The bracing cable system can have multiple (one or more cables) cables anchoring the structure to anchors inserted on the ground.

With the deployable stage 18 is firmly deployed, anchored, and leveled with the computerized leveling system, or manually, then the stage performing platform can be deployed. The standing platform deployment consists of a hydraulic (or pneumatic) system that lowers the left and right main wings, at the same time (or approximately at the same time) to a point where it is horizontally leveled.

The size of the platform 18 can be varied as desired. The stage platform 18 can be designed to receive tiled flooring, which is nestled in a metal "upside-down" "T" grid to secure the tiles in place. The tile system may be plastic, metallic, or conceivable material. The tiles can be removed, and stored, or transported, separately. The stage platform tiles can have designs, perforations, or they can be blind solid flat material. The stage platform can also be made of one single flat piece of flooring. The stage platform has mountable brackets to hold performing equipment, lighting systems, lights, still/video/film cameras, recording equipment, and/or special effects systems with its corresponding cable trays to hold electrical cables, and/or whatever is necessary to make the performing equipment, lighting systems, lights, still/video/film cameras, recording equipment, and/or special effects systems in order to make a complete functioning system for the end user. The stage platform preferably has, on its floor or sides, electrical outlets where electrical equipment can be plugged in for function.

The stage platform can be of a desired shape, including square, rectangular, circular, or shaped in designs combining square shapes and round shapes, according to the application requirements, or end user requests.

The stage platform is attached to the main central frame of the deployable stage. It is attached either by hinges, welded in place, or bolted in place to form a complete system.

Once the entire structure is secured, leveled, supported, and well anchored in place, and after the deployment of the stage platform, the arched frame portion 30 is deployed via a hydraulic system, a pneumatic system, a mechanical system, cable/pulley system, manually, or a combination of some, or all these systems.

The movement to deploy and undeployed the arched frame portion 30 are controlled with a computer system that controls the actuators for deployment, and the upper telescoping truss section 36A and 36B can track on a tracking wheel system inside of the lower telescoping truss sections 34A and 34B, respectively, which allows the upper telescoping truss section 36A and 36B to track in and out of the lower telescoping truss sections 34A and 34B.

The upper telescoping truss section 36A and 36B and/or lower telescoping truss sections 34A and 34B have mountable brackets to hold performing equipment, lighting systems, still/video/film cameras, recording equipment, and/or special effects systems with cable trays to hold electrical and data cables, etc., feeding same.

The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described.

What is claimed is:

1. A mobile arched telescopic deployable stage system, comprising:
    a stage portion, the stage portion having a main stage portion and at least one extension stage portion, the extension stage portion being connected to the main stage portion and deployable from an undeployed state where the extension stage portion is folded up relative to the main stage portion, to a deployed state were the main stage portion and extension stage portion are laid out flat;
    deployable legs adapted to extend under the stage portion; and
    at least one arched frame portion, the arched frame portion having a right side section and a left side section, each of the right and left side sections having a lower arched portion and an upper arched portion, the upper arched portion being relatively unextended from the lower arched portion in a first shorter, undeployed state, to a second, longer extended state where the upper arched portion is extended from the lower arched portion, terminal ends of the upper arched portions being pivotally attached to each other, and each of the lower arched portions being pivotally attachable at lower ends thereof to the stage portion.

2. The mobile arched telescopic deployable stage system of claim 1, wherein the stage portion, the deployable legs, and the at least one arched frame portion are stored and transported in a truck trailer.

3. The mobile arched telescopic deployable stage system of claim 1, wherein the stage portion comprises one main stage portion, a first extension stage portion, and a second extension stage portion, the second extension stage portion being hingeably attached on a first side to a first side of the second extension portion, a second side of the second extension portion in turn being hingeably attached to a first side of the main stage portion.

4. The mobile arched telescopic deployable stage system of claim 2, wherein the stage portion further comprises a third extension stage portion, and a fourth extension stage portion, the third extension stage portion being hingeably attached on a first side to a first side of the fourth extension portion, a second side of the fourth extension portion in turn being hingeably attached to a second side of the main stage portion.

5. The mobile arched telescopic deployable stage system of claim 1, wherein the deployable legs adapted to extend under the stage portion comprise generally horizontal supports that are hingeably attached to a framework under the main stage portion, the generally horizontal supports having generally vertical and droppable legs, wherein the generally horizontal supports are moved between an undeployed stated where they are moved close to the framework, and a deployed state where they are extended away from the framework so as to be available to support the extension stage portions when the extension stage portions are deployed flat.

6. The mobile arched telescopic deployable stage system of claim 1, wherein the lower arched portions have a tunnel formed therein in which the upper arched portions are slideably retained.

7. The mobile arched telescopic deployable stage system of claim 1, further comprising deployable accessory arms, which deployable accessory arms are pivotally mounted to the right side section and a left side section of the arched frame portion.

8. The mobile arched telescopic deployable stage system of claim 1, further comprising raising devices to raise the right side section and a left side section of at least one arched frame portion.

9. The mobile arched telescopic deployable stage system of claim 1, further comprising at least one of speaker supports, display screen supports, and lighting supports.

10. The mobile arched telescopic deployable stage system of claim 1, further comprising a deployable arched backdrop, which deployable arched backdrop deploys above the stage behind the at least one arched frame portion.

11. The mobile arched telescopic deployable stage system of claim 1, wherein there are two arched frame portions.

12. A mobile arched telescopic deployable stage system, comprising:
    a stage portion, the stage portion having a main stage portion and at least one extension stage portion, the extension stage portion being connected to the main stage portion and deployable from an undeployed state where the extension stage portion is folded up relative to the main stage portion, to a deployed state were the main stage portion and extension stage portion are laid out flat;
    deployable legs adapted to extend under the stage portion;
    at least one arched frame portion, the arched frame portion having a right side section and a left side section, each of the right and left side sections having a lower arched portion and an upper arched portion, the upper arched portion being relatively unextended from the lower arched portion in a first shorter, undeployed state, to a second, longer extended state where the upper arched portion is extended from the lower arched portion, terminal ends of the upper arched portions being pivotally attached to each other, and each of the lower arched portions being pivotally attachable at lower ends thereof to the stage portion;

raising devices to raise the right side section and a left side section of at least one arched frame portion; and a deployable arched backdrop, which deployable arched backdrop deploys above the stage behind the at least one arched frame portion.

13. The mobile arched telescopic deployable stage system of claim 12, wherein the mobile arched telescopic deployable stage system are stored and transported in a truck trailer when undeployed, with the truck trailer being removed when the stage system is fully deployed.

14. The mobile arched telescopic deployable stage system of claim 12, wherein the stage portion comprises one main stage portion, a first extension stage portion, and a second extension stage portion, the second extension stage portion being hingeably attached on a first side to a first side of the second extension portion, a second side of the second extension portion in turn being hingeably attached to a first side of the main stage portion.

15. The mobile arched telescopic deployable stage system of claim 14, wherein the stage portion further comprises a third extension stage portion, and a fourth extension stage portion, the third extension stage portion being hingeably attached on a first side to a first side of the fourth extension portion, a second side of the fourth extension portion in turn being hingeably attached to a second side of the main stage portion.

16. The mobile arched telescopic deployable stage system of claim 12, wherein the deployable legs adapted to extend under the stage portion comprise generally horizontal supports that are hingeably attached to a framework under the main stage portion, the generally horizontal supports having generally vertical and droppable legs, wherein the generally horizontal supports are moved between an undeployed stated where they are moved close to the framework, and a deployed state where they are extended away from the framework so as to be available to support the extension stage portions when the extension stage portions are deployed flat.

17. The mobile arched telescopic deployable stage system of claim 12, wherein the lower arched portions have a tunnel formed therein in which the upper arched portions are slideably retained.

18. The mobile arched telescopic deployable stage system of claim 12, further comprising deployable accessory arms, which deployable accessory arms are pivotally mounted to the right side section and a left side section of the arched frame portion.

* * * * *